US011425565B2

(12) United States Patent
Kanagarathinam et al.

(10) Patent No.: US 11,425,565 B2
(45) Date of Patent: Aug. 23, 2022

(54) METHOD AND SYSTEM FOR MPQUIC OVER QSOCKS IN WIRELESS NETWORK

(71) Applicant: Samsung Electronics Co., Ltd., Suwon-si (KR)

(72) Inventors: Madhan Raj Kanagarathinam, Bangalore (IN); Sujith Rengan Jayaseelan, Bangalore (IN); Gaurav Sinha, Bangalore (IN); Bhagwan Dass Swami, Bangalore (IN); Gunjan Kumar Choudhary, Bangalore (IN); Karthikeyan Arunachalam, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 157 days.

(21) Appl. No.: 16/810,261

(22) Filed: Mar. 5, 2020

(65) Prior Publication Data

US 2020/0288316 A1    Sep. 10, 2020

(30) Foreign Application Priority Data

Mar. 6, 2019   (IN) .............................. 201941008695
Nov. 20, 2019  (IN) .............................. 201941008695

(51) Int. Cl.
*H04W 12/06*     (2021.01)
*H04W 80/06*     (2009.01)
(Continued)

(52) U.S. Cl.
CPC ......... *H04W 12/068* (2021.01); *H04L 69/162* (2013.01); *H04L 69/164* (2013.01); *H04W 80/06* (2013.01); *H04L 69/163* (2013.01)

(58) Field of Classification Search
CPC ..... H04L 69/164; H04L 69/162; H04L 63/08; H04L 63/166; H04L 69/163; H04W 80/06; H04W 12/06; H04W 12/068
See application file for complete search history.

(56) References Cited

U.S. PATENT DOCUMENTS

2005/0262251 A1    11/2005  Klemets et al.
2014/0258705 A1*   9/2014   Roskind .............. H04L 67/2814
                                                          713/150
(Continued)

OTHER PUBLICATIONS

De Coninck et al. "Multipath QUIC_Design and Evaluation." 2017. (Year: 2017).*

(Continued)

*Primary Examiner* — Oussama Roudani
(74) *Attorney, Agent, or Firm* — Jefferson IP Law, LLP

(57) ABSTRACT

A method for Multipath Quick User Datagram Protocol (UDP) Internet Connections (MPQUIC) over Quick SOCKS (QSOCKS) in a wireless network is provided. The method includes receiving, by a QSOCKS server, a Client Hello (CHLO) message from a QSOCKS client device using a QSOCKS method tag, wherein the CHLO message comprises a plurality of client-supported SOCKS Authentication (AUTH) procedures, selecting, by the QSOCKS server, a candidate client-supported SOCKS AUTH procedure from the plurality of client-supported SOCKS AUTH procedures, and transmitting, by the QSOCKS server, a reject packet using the QSKM tag to the QSOCKS client device, wherein the reject packet includes information indicating the selected candidate client-supported SOCKS AUTH procedure.

20 Claims, 18 Drawing Sheets

(51) Int. Cl.
*H04L 29/06* (2006.01)
*H04L 69/164* (2022.01)
*H04L 69/16* (2022.01)
*H04L 69/163* (2022.01)

(56) References Cited

U.S. PATENT DOCUMENTS

2016/0134515 A1    5/2016   Daw
2016/0241528 A1    8/2016   Kulkarni et al.
2017/0026340 A1    1/2017   Alayli et al.
2018/0241727 A1    8/2018   Verzun et al.
2019/0319873 A1*  10/2019   Shelar .................... H04L 45/22

OTHER PUBLICATIONS

Kumar et al. "Implementation and Analysis of QUIC for MQTT." Jan. 2019. (Year: 2019).*
Brunstrom et al., Implementing Interfaces to Transport Services, draft-ietf-taps-impl-00, May 25, 2018. (Year: 2018).*
Coninck et al., A First Analysis of Multipath TCP on Smartphones, 17th International Conference, Passive and Active Measurement (PAM) 2016, Heraklion, Greece, Mar. 31-Apr. 1, 2016, pp. 57-69.
International Search Report and Written Opinion dated Jun. 11, 2020, Issued in International Application No. PCT/KR2020/003104.
SOCKS Protocol Version 6, Internet Area Working Group draft-olteanu-intarea-socks-6-05. Dated Oct. 23, 2018. pp. 1-29.
Unlicensed Integration with 5G Networks. Wireless Broadband Alliance. Driving Next Wireless Experience Dated Oct. 1, 2018.

* cited by examiner

| VER | CMD | RSV | ATYP | DST. ADDR | DST. PORT | REQ. TYPE |
|---|---|---|---|---|---|---|
| 1 | 1 | X '00' | 1 | Variable | 2 | 1 |

- VER : version : X '06'
- CMD :
    - TCP CONNECT X '01'
    - TCP BIND X '02'
    - UDP ASSOCIATE X '03'
    - TCP OVER QUIC X '04'
    - UDP OVER QUIC X '05'
- RSV : RESERVED

- ATYP : address type of following address
    - IP V4 address : X '01'
    - DOMAINNAME : X '03'
    - IP V6 address : X '04'

- DST.ADDR - desired dest address
- DST.PORT - desired dest port
- REQ.TYPE
    - ASYNC X '00'
    - SYNC X '01'

FIG.7C

METHOD AND SYSTEM FOR MPQUIC OVER QSOCKS IN WIRELESS NETWORK

CROSS-REFERENCE TO RELATED APPLICATION(S)

This application is based on and claims priority under 35 U.S.C. § 119(a) of an Indian Provisional patent application Serial number 201941008695, filed on Mar. 6, 2019, in the Indian Patent Office, and of an Indian Complete patent application Serial number 201941008695, filed on Nov. 20, 2019, in the Indian Patent Office, the disclosure of each of which is incorporated by reference herein in its entirety.

BACKGROUND

1. Field

The disclosure relates to a mobile communication. More particularly, the disclosure relates to method and system for Multipath Quick User Datagram Protocol Internet Connections (MPQUIC) over Quick SOCKS (QSOCKS) in a wireless network.

2. Description of Related Art

Quick User Datagram Protocol (UDP) Internet Connection (QUIC) is an encrypted, multiplexed low-latency transport protocol providing reliable in-order data transfer that is designed to improve web performance for Hypertext Transfer Protocol (HTTP) Secure (HTTPS). Implemented on top of User Datagram Protocol (UDP), the QUIC circumvents deployment obstacles as experienced by recent transport protocol innovations. In contrast to transport protocols such as Transmission Control Protocol (TCP) and Stream Control Transmission Protocol (SCTP), the QUIC does not require changes in an operating system (OS), making it easily deployable within applications in UserLAnd.

Unlike the TCP and its evolution Multi-path TCP (MPTCP), QUIC natively multiplexes application streams on a single connection. This supersedes multiplexing HTTP/2 streams on a single TCP stream. First existing internet-scale QUIC deployments confirm QUIC's design decisions, showing high performance and marginal middlebox interference. With recently initiated Internet Engineering Task Force (IETF) standardization, QUIC, which started as the TCP replacement to transport HTTP/2, is becoming a universal transport protocol. QUIC encrypts data and almost all the header fields. This prevents middleboxes from interfering with QUIC and ensures that the protocol will not be ossified by deployed middleboxes. QUIC uses a flexible packet format and leverages reliability and congestion control mechanisms of modern TCP stacks. QUIC supports different streams that prevent head-of-line blocking when downloading different objects from a single server.

When multipathing in QUIC, one missing feature is the ability to exploit the different paths that exist between a client (i.e., a user) and a server. Mobile devices (10) such as smartphones may have several wireless interfaces, and users expect to be able to combine wireless interfaces. Furthermore, a growing fraction of hosts are dual-stack and the Internet protocol (IP) version 4 (IPv4) and IP version 6 (IPv6) paths between the users (10) and an MPTCP proxy (or server) (20) often differ and have different performance. The MPTCP is the TCP extension that addresses performance problems, since it enables the TCP connection to send data over different paths.

FIG. 1 illustrates MPTCP in smartphones combining Wi-Fi and a cellular network for better throughput and resilience, according to the related art.

Referring to FIG. 1, the MPTCP can aggregate the bandwidth of different paths. This is beneficial on smartphones that need to combine Wi-Fi and a cellular network. Experience with the MPTCP on smartphones shows that multipath can provide seamless handovers. This gives rise to a need of multipathing in the QUIC to utilize both Wi-Fi and Long-Term Evolution (LTE) (i.e., a cellular network), and for better resilience in case of path failures.

There are two main motivations for adding multipath capabilities to a protocol such as QUIC. One is to pool resources of different paths to transport the data for a single connection. This is important for large transfers on multihomed devices such as the smartphones, but can also allow dual-stack hosts to automatically select the best path when the quality of the IPv4 and IPv6 paths differ. Another is resilience to connectivity failures. In smartphones, a wireless network can fail at any time, and users expect their applications to seamlessly switch to another network without any visible impact.

The current Gigabit-class long term evolution (GigaLTE) uses SOCKS version 5 (SOCKSv5) to proxy the MPTCP, making it server-agnostic. SOCKSv5 introduces connection overhead consuming multiple round-trip-times (RTT) to establish a connection. SOCKSv5 amplifies the impact when an application uses HTTPS. Measurements have shown many popular applications use short-lived connections that exchange small amounts of data, as shown in FIG. 2. Increasing the setup time by the SOCKS and MPTCP handshake will affect the user experience.

SOCKS increases the time required to establish each TCP connection by several RTTs between the client and the SOCKS server. This additional delay can be significant for applications that rely on short TCP connections. FIG. 3A depicts the additional RTT in the GigaLTE environment. To address the TCP initial connection overhead, QUIC uses zero round trip time (0-RTT) connections that accelerate the latency during establishment of a connection.

FIG. 2 illustrates a graphical representation of a duration and data transfer by popular applications of the smartphones for short-lived connections using HTTPS over SOCKSv5 according to the related art.

FIG. 3A is a sequence diagram illustrating a method for MPTCP over a SOCKSv5 connection establishment in a GigaLTE environment, according to the related art.

Referring to FIG. 3A, at 32a of sequence diagram 30a, the MPTCP user equipment (UE) (10) (i.e., using an LTE network) sends a synchronous message with multipath capability to an MPTCP proxy (20). At 34a, the MPTCP proxy (20) sends a synchronous acknowledgement (ACK) message to the MPTCP UE (10). At 36a, the MPTCP UE (10) sends an ACK message with multipath capability to the MPTCP proxy (20). At 38a, the MPTCP UE (10) sends a client negation to the MPTCP proxy (20). At 40a, the MPTCP proxy (20) sends a server negation to the MPTCP UE (10). At 42a, the MPTCP UE (10) sends an authentication request to the MPTCP proxy (20). At 44a, the MPTCP proxy (20) sends an authentication response to MPTCP UE (10). At 46a, the MPTCP UE (10) sends a client request to the MPTCP proxy (20). At 48a, the MPTCP proxy (20) sends a synchronous message to a destination server (21). At 50a, the destination server (21) sends a synchronous ACK message to the MPTCP proxy (20). At 52a, the MPTCP proxy (20) sends an ACK message to the destination server (21). At 54a, the MPTCP proxy (20) sends a server reply to the MPTCP UE (10). At 56a, data transmission starts between the MPTCP UE (10) and the MPTCP proxy (20). At 58a, data transmission starts between the MPTCP proxy (20) and the destination server (21).

At 60a, the MPTCP UE (10) (i.e., using a Wi-Fi network) sends a synchronization with multipath join request to the MPTCP proxy (20). At 62a, the MPTCP proxy (20) sends a synchronization ACK message to the MPTCP UE (10). At 64a, the MPTCP UE (10) sends an ACK join message to the MPTCP proxy (20). At 66a, data transmission starts between the MPTCP UE (10) and the MPTCP proxy (20). At 68a, data transmission starts between the MPTCP proxy (20) and the destination server (21).

FIGS. 3B and 3C are sequence diagrams illustrating a method for current SOCKET in SOCKS, according to the related art.

Referring to FIG. 3B, at 32b of sequence diagram 30B, an application-1 (31) is on. At 34b, the application-1 (31) sends a domain name system (DNS) query to a DNS server (36). At 36b, the DNS server (36) sends DNS query response to the application-1 (31). At 38b, the application-1 (31) sends an HTTP request to an external server (38). At 40b, the external server (38) sends an HTTP response to the application-1 (31). At 42b, the application-1 (31) sends an MPTCP on message to an MPTCP server (33).

At 44b, the application-1 (31) sends a DNS request to the DNS server (36). At 46b, the DNS server (36) sends a DNS response to the application-1 (31). At 48b, the application-1 (31) connects with the MPTCP server (33). At 50b, MPTCP communication starts between the MPTCP server (33) and a SOCK HTTP stack (34). At 52b, the MPTCP communication starts between the SOCK HTTP stack (34) and a MPTCP kernel (35). At 54b, the MPTCP kernel (35) sends a TCP synchronous message to a proxy (37). At 56b, the proxy (37) sends a TCP synchronous ACK message to the MPTCP kernel (35). At 58b, the MPTCP kernel (35) sends TCP an ACK to the proxy (37).

At 60b, the SOCK HTTP stack (34) sends a SOCKS version identifier method selection (version, method count, method) to the proxy (37). At 62b, the proxy (37) sends an ACK for the SOCKS version identifier method selection to the SOCK HTTP stack (34). At 64b, the SOCK HTTP stack (34) sends a SOCKS method selection (method) to the proxy (37). At 66b, the proxy (37) sends an ACK for the SOCKS method selection to the SOCK HTTP stack (34). At 68b, the SOCK HTTP stack (34) sends a SOCKS authentication (SOCKS AUTH) response (username, password) to the proxy (37). At 70b, the proxy (37) sends an ACK for the SOCKS authentication response to the SOCK HTTP stack (34). At 72b, the SOCK HTTP stack (34) sends a SOCKS authentication response (success) to the proxy (37). At 74b, the proxy (37) sends an ACK for the SOCKS authentication response (success) to the SOCK HTTP stack (34). At 76b, the SOCK HTTP stack (34) sends a SOCKS connection request (server IP, server port) to the proxy (37). At 78b, the proxy (37) sends an ACK for the SOCKS connection request to the SOCK HTTP stack (34). At 80b, the proxy (37) sends a TCP synchronization message to the external server (38).

At 82b, the external server (38) sends an ACK for the TCP synchronization message to the proxy (37). At 84b, the proxy (37) sends TCP an ACK to the external server (38). At 86b, the SOCK HTTP stack (34) sends a SOCKS connection reply (result) to the proxy (37). At 88b, the proxy (37) sends an ACK for the SOCKS connection reply to the SOCK HTTP stack (34). At 90b, the SOCK HTTP stack (34) sends a success message to the MPTCP server (33). At 92b, the MPTCP server (33) sends an MPTCP flag (true) to the DB server (32).

The current versions of SOCKS (v4 and v5) cannot work with a QUIC directly. The legacy SOCKS client informs the interested server details (server IP, server port, and method) during the socket establishment. In the QUIC due to multiplexing concept, the SOCKET is established only once (i.e., there is only one connected socket but multiple relay sockets). In TCP, as each socket is an individual entity, method negotiation is part of the initial TCP handshake. In QUIC an alternative design is required for multiple connections. A method which communicates request and response of the server details for QUIC is provided herein.

Current SOCKET methods in SOCKS (viz. connect, bind, relay) do not work well with QUIC due to the multiplexing of connections. Hence, a method for the QUIC connection is needed. The initial parameters (client and server method selection) need not be always verified. QUIC has the advantage of one-time control stream management for the transport layer security protocol (TLS) version 1.3 negotiation. A method which makes use of the control stream for the SOCKS initial parameters exchange to reduce the initial RTTs is also provided.

SOCKS and QUIC do not work hand-in-hand. In QUIC, a connection need only be established once with the SOCKS server and multiplex the streams. Hence, a new method for QUIC over SOCKS is required. The present method also overcomes the disadvantage of several RTTs in the SOCKS.

FIG. 4 is a block diagram of a QUIC packet, according to the related art.

Referring to FIG. 4, the main objective of QUIC is to provide a deployable, secure, and low latency protocol. With the currently ongoing standardization by the IETF, QUIC is becoming a general-purpose transport protocol.

QUIC addresses deployability issues by running on top of UDP. Since UDP is an established transport protocol, the operation of QUIC is usually not disturbed by middleboxes, as shown with wide-scale deployments in today's Internet. Further, running on top of UDP enables userLAnd implementations of QUIC with unmodified operating systems. Therefore, QUIC implementations can be easily upgraded and shipped with applications.

Further, for connection identification in contrast to TCP, QUIC connection is not identified by the Internet protocol (IP) address/port tuple, but uses a connection identifier (ID) to enable connection migrations between the IP-address/port tuples.

Further, QUIC always provides encryption and authentication, except for handshake and reset packets. By authenticating the header, QUIC prevents middleboxes from manipulations and limits protocol ossification. The QUIC payload is always encrypted. To achieve QUIC's low latency objective, cryptographic information is shared together with transport information in one handshake. After a client becomes aware of the initial keys of the server, it is possible to establish new QUIC connections with zero-RTT (0-RTT) data delay.

Further, QUIC provides stream-multiplexing, which is an ability to handle several request/response pairs concurrently on a single connection by using multiple streams. Each stream is identified by a StreamID and has a sequence number space in an offset-header to reduce inter-stream dependencies. Thus, packet loss does not block the entire connection, but only the affected streams which are transmitted in the lost packet. This efficiently avoids head-of-line blocking between streams. To open a stream, a client or a server sends data marked with an unused StreamID. The appearance of the unused StreamID implicitly triggers the creation of a new stream at the receiving side. This reduces the required hand-shake messages as well as protocol complexity, and allows a O-RTT stream establishment. QUIC internally multiplexes streams using frames. The QUIC packet may contain multiple frames of potentially different streams, as well as additional control frames.

The current SOCKS protocol was designed primarily to proxy TCP by signaling control messages in each TCP connection. Moreover, SOCKS and QUIC do not work hand-in-hand. In QUIC, connection establishment is performed only once with the SOCKS server and multiplexes the streams among it. Hence, a new design for QUIC over SOCKS is required. The design also must overcome the disadvantage of using several RTTs in SOCKSv5.

Thus, there is a need to address the above-mentioned disadvantages and other shortcomings of the related art.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for Multipath Quick User Datagram Protocol (UDP) Internet Connections (MPQUIC) over Quick SOCKS (QSOCKS) in a wireless network.

Another aspect of the disclosure is to advertise a Client Hello (CHLO) message to a QSOCKS server using a QSOCKS method (QSKM) tag, wherein the CHLO message comprises a plurality of client-supported SOCKS Authentication (AUTH) procedures.

Another aspect of the disclosure is to select a candidate client-supported SOCKS AUTH procedure from the plurality of client-supported SOCKS AUTH procedures.

Another aspect of the disclosure is to send the selected candidate client-supported SOCKS AUTH procedure in a reject packet using the QSKM tag.

Another aspect of the disclosure is to advertise the CHLO message to the QSOCKS server using a QSOCKS authentication (QSKA) tag, wherein the CHLO message comprises client credentials selected based on the selected AUTH method, wherein the QSKA tag contains a SOCKS AUTH sub-negotiation.

Another aspect of the disclosure is to verify the credentials of the QSOCKS client device and send a QUIC Server Hello (SHLO) message using the QSKA tag in response to successful verification of the credentials.

Another aspect of the disclosure is to send a QSOCKS request, evaluate the QSOCKS request based on source and destination addresses, and return one or more reply messages, initiate SOCKS session, and send a QSOCKS response to the QSOCKS client device.

Additional aspects will be set forth in part in the description which follows and, in part, will be apparent from the description, or may be learned by practice of the presented embodiments.

In accordance with an aspect of the disclosure, a method for MPQUIC over QSOCKS in a wireless network is provided. The method includes receiving, by a QSOCKS server, a CHLO message from a QSOCKS client device using a QSOCKS method tag, wherein the CHLO message comprises a plurality of client-supported SOCKS AUTH procedures, selecting, by the QSOCKS server, a candidate client-supported SOCKS AUTH procedure from the plurality of client-supported SOCKS AUTH procedures, and transmitting, by the QSOCKS server, a reject packet using the QSKM tag to the QSOCKS client device, wherein the reject packet includes information indicating the selected candidate client-supported SOCKS AUTH procedure.

In accordance with another aspect of the disclosure, a method for MPQUIC over QSOCKS in a wireless network is provided. The method includes transmitting, by a QSOCKS client device, a CHLO message to a QSOCKS server using a QSOCKS method tag, wherein the CHLO message comprises a plurality of client-supported SOCKS AUTH procedures, and receiving, by the QSOCKS client device, a reject packet using the QSKM tag from the QSOCKS server, wherein the reject packet includes information indicating a candidate client-supported SOCKS AUTH procedure which is selected by the QSOCKS server from the plurality of client-supported SOCKS AUTH procedures.

In accordance with another aspect of the disclosure, a QSOCKS server for MPQUIC over QSOCKS in a wireless network is provided. The QSOCKS server includes a memory, a transceiver, and at least one processor coupled to the memory and the transceiver, wherein the at least one processor is configured to receive a CHLO message from a QSOCKS client device using a QSOCKS method tag, wherein the CHLO message comprises a plurality of client-supported SOCKS AUTH procedures, select a candidate client-supported SOCKS AUTH procedure from the plurality of client-supported SOCKS AUTH procedures, and transmit a reject packet using the QSKM tag to the QSOCKS client device, wherein the reject packet includes information indicating the selected candidate client-supported SOCKS AUTH procedure.

In accordance with another aspect of the disclosure, a QSOCKS client device for MPQUIC over QSOCKS in a wireless network is provided. The QSOCKS client device includes a memory, a transceiver, and at least one processor coupled to the memory and the transceiver, wherein the at least one processor is configured to transmit a CHLO message to a QSOCKS server using a QSOCKS method tag, wherein the CHLO message comprises a plurality of client-supported SOCKS AUTH procedures, and receive a reject packet using the QSKM tag from the QSOCKS server, wherein the reject packet includes information indicating a candidate client-supported SOCKS AUTH procedure which is selected by the QSOCKS server from the plurality of client-supported SOCKS AUTH procedures.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7C illustrates a QSOCKS request header format, according to an embodiment of the disclosure;

Throughout the drawings, like reference numerals will be understood to refer to like parts, components, and structures.

DETAILED DESCRIPTION

Figure 1:
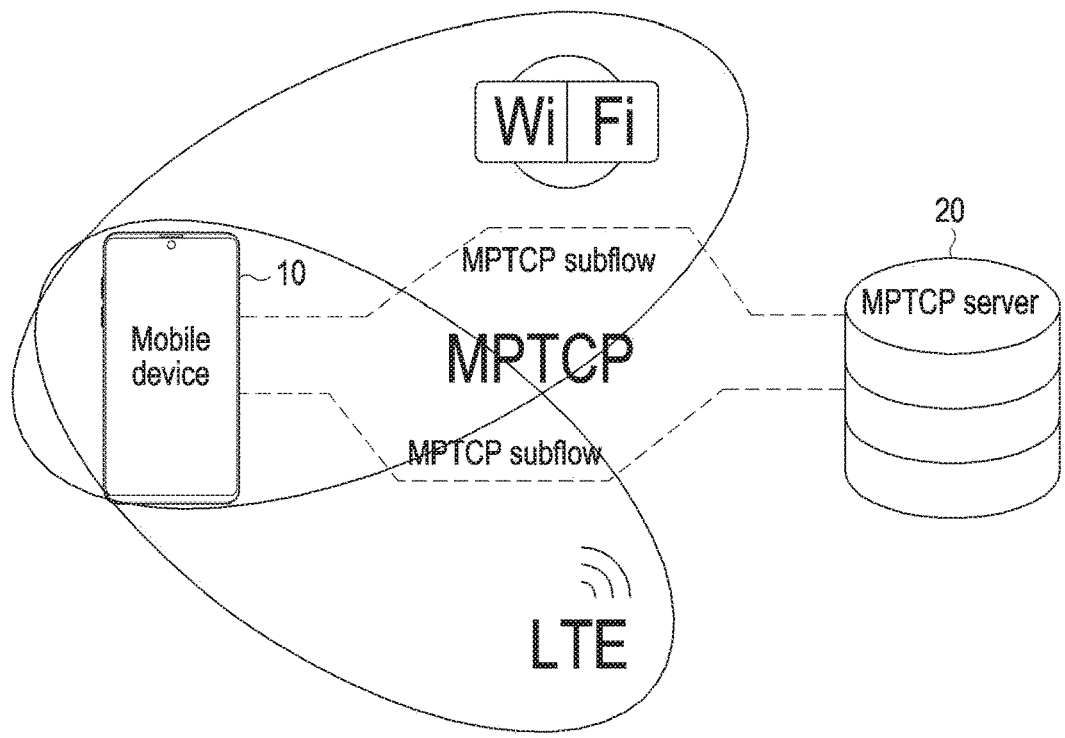
FIG. 1 illustrates a Multi-path transmission control protocol (TCP) (MPTCP) in smartphones can combine Wi-Fi and cellular network for better throughput and resilience, according to the related art.
Figure 2:
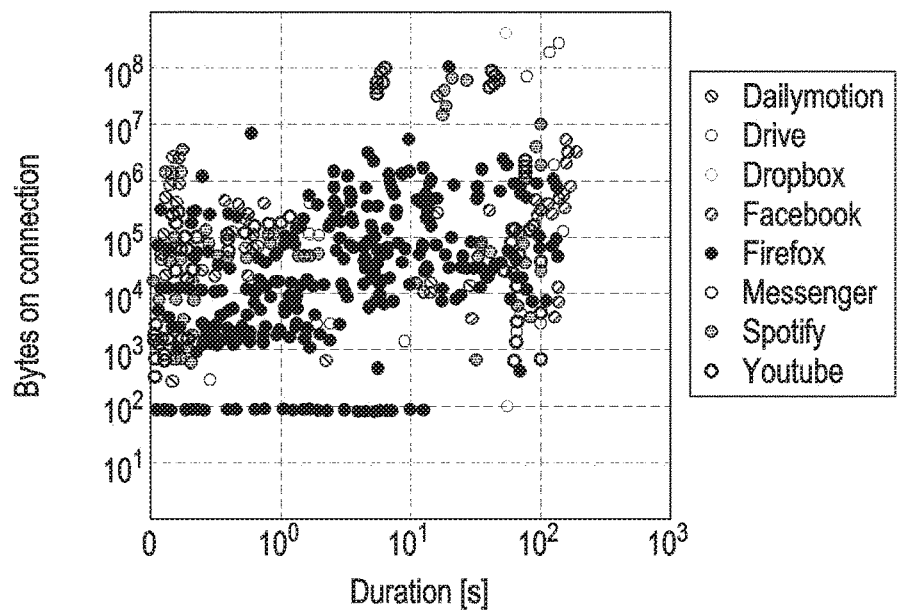
FIG. 2 illustrates a graphical representation of a duration and data transfer by popular applications of the smartphones for short-lived connections using hypertext transfer protocol secure (HTTPS) over SOCKS version 5 (SOCKSv5) according to the related art.
Figure 3A:
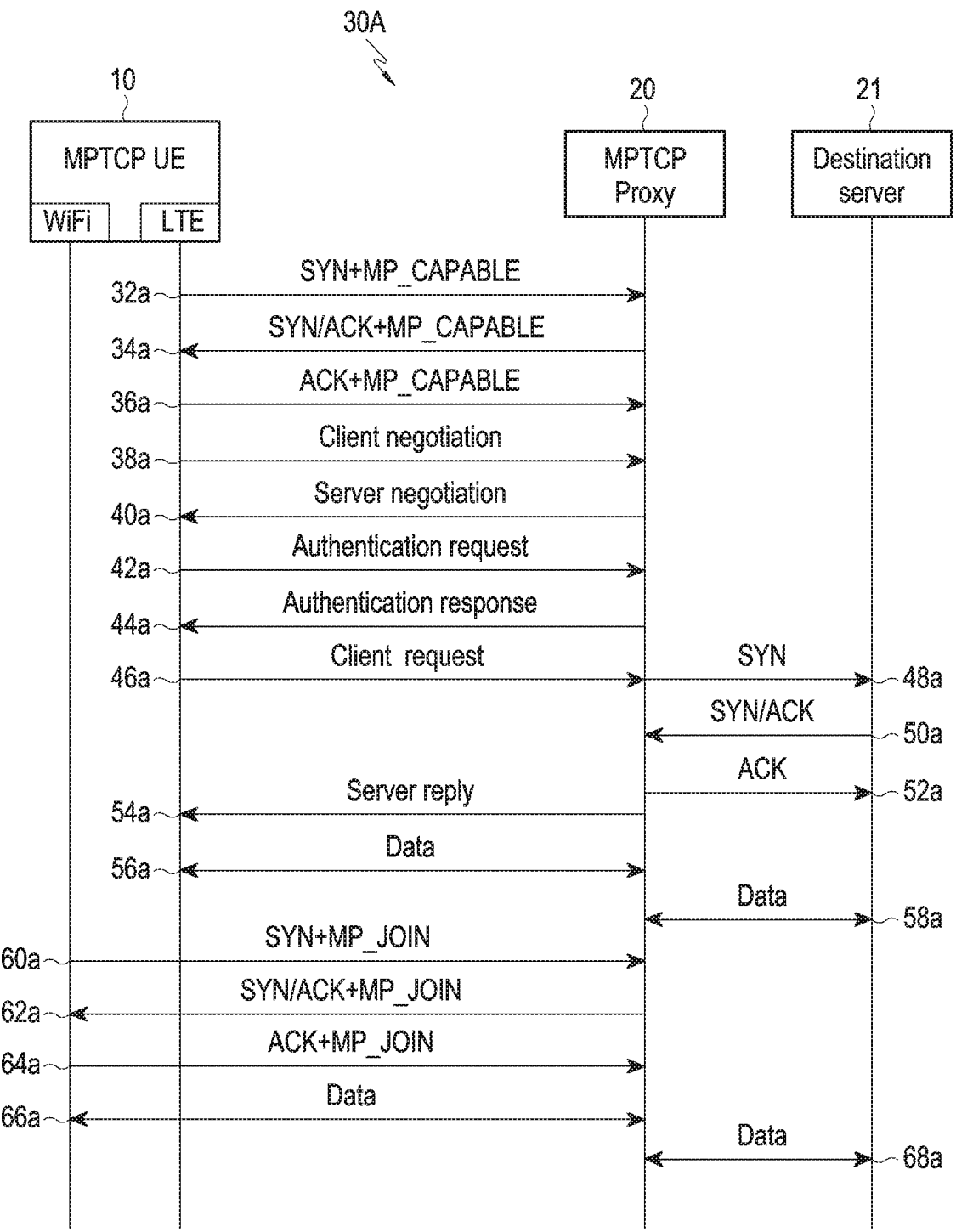
FIG. 3A is a sequence diagram illustrating a method for MPTCP over a SOCKSv5 connection establishment in a Gigabit-Class long term evolution (GigaLTE) environment, according to the related art.
Figure 3B:
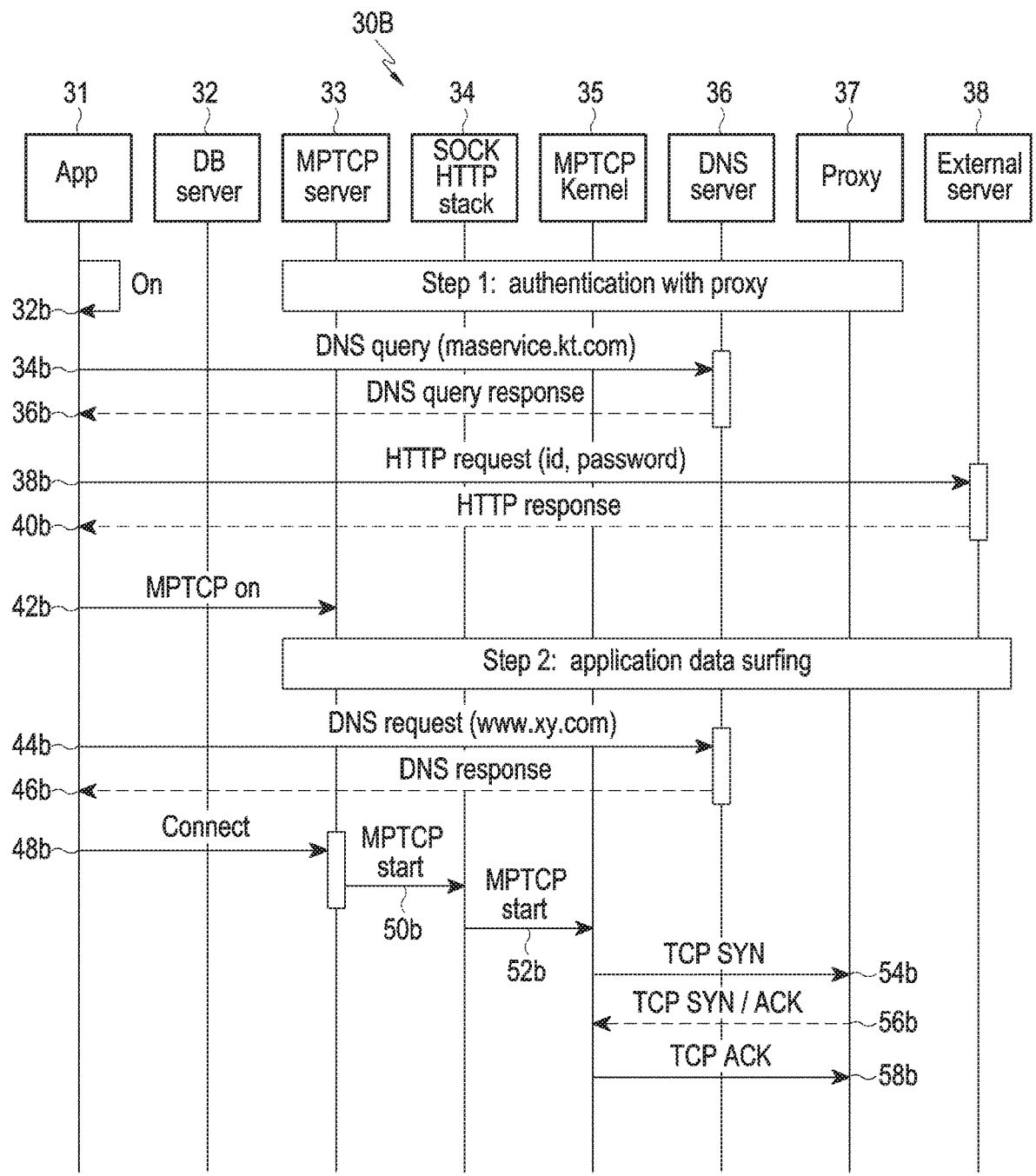
FIGS. 3B and 3C are sequence diagrams illustrating a method for current SOCKET in SOCKS, according to the related art.
Figure 3C:
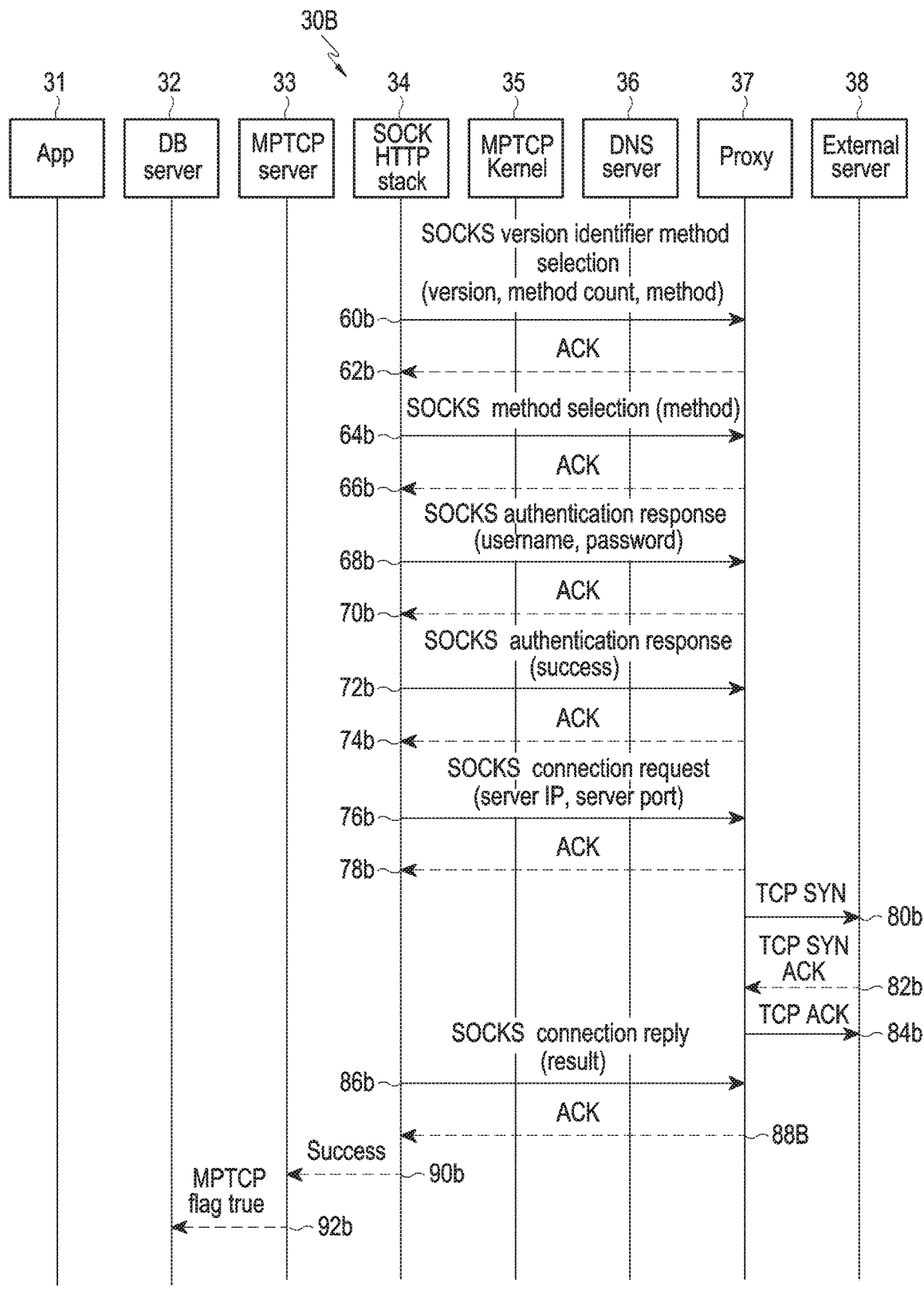
Figure 4:
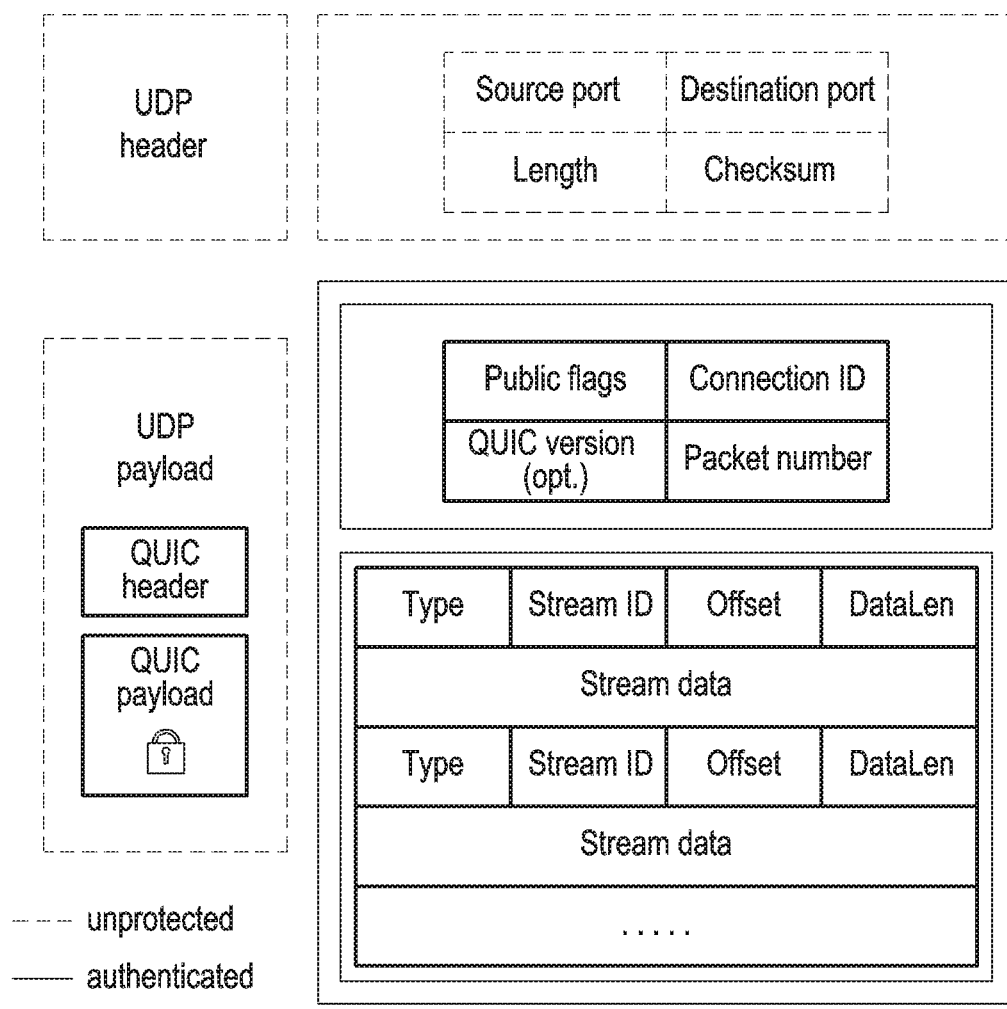
FIG. 4 is a block diagram of a Quick User Datagram Protocol Internet Connections (QUIC) packet, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Existing protocols provide mechanisms to establish additional paths and schedule traffic between paths. Many existing protocols, such as multipath transmission control protocol (TCP) (MPTCP) and stream control transmission protocol (SCTP) require operating system (OS) support. This slows down initial protocol adoption and innovations after deployment, in particular, as mobile devices are known to have long OS update intervals.

In existing multipathing protocols, e.g., maximum multipath TCP (MMPTCP) and multipath user datagram protocol (UDP) (MPUDP) are designed for specific network environments, such as data centers or virtual private networks, respectively. The MPTCP is the most widely known multipathing transport protocol. Existing MPTCP deployments showed the potential benefits of multipathing. However, the design of the MPTCP suffers due to its TCP roots, like, the complex TCP headers with an additional sequence number space and checksums. These TCP headers mitigate most but not all middlebox interference, a common problem of recent protocol innovations, such as the MPTCP, SCTP and a datagram congestion control protocol (DCCP). In contrast to the MPTCP, MCTCP adds a shim layer on top of multiple TCP connections and encodes most control information in the payload.

The proposed multipath quick UDP Internet connection (MPQUIC) has conceptual design advantages over previously proposed multipath transport protocols. A quick UDP Internet connection (QUIC) is easily deployable and enables integration of multipath control information with minimal middle-box interference. The QUIC combines necessary semantics, e.g., of multiple application flows and the corresponding hypertext transfer protocol (HTTP)/2 priorities, to schedule packets in heterogeneous environments.

Accordingly, the embodiments herein provide a QSOCKS server for MPQUIC over Quick SOCKS (QSOCKS) in a wireless network. The QSOCKS server includes a memory and a processor coupled with the memory. The processor is configured to receive Client Hello (CHLO) message from a QSOCKS client device using a QSOCKS method (QSKM) tag, wherein the CHLO message comprises a plurality of client-supported SOCKS Authentication (AUTH) procedures. Further, the processor is configured to select a candidate client-supported SOCKS AUTH procedure from the plurality of client-supported SOCKS AUTH procedures. Further, the processor is configured to send the selected candidate client-supported SOCKS AUTH procedure in a reject packet using the QSKM tag.

Referring now to the drawings, and more particularly to FIGS. 5A through 8, there are shown preferred embodiments.

Figure 5A:
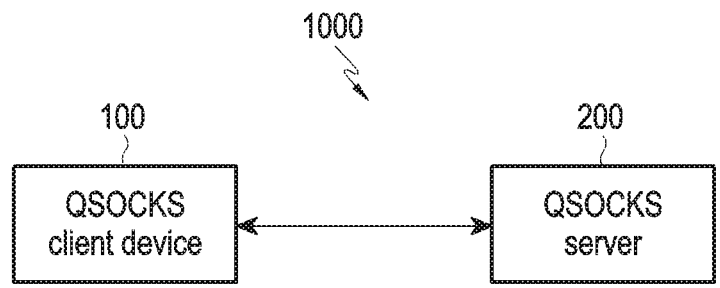
FIG. 5A illustrates a Multipath QUIC (MPQUIC) over Quick SOCKS (QSOCKS) in a wireless network, according to an embodiment of the disclosure.

FIG. 5A illustrates MPQUIC over QSOCKS in a wireless network (1000), according to an embodiment of the disclosure. The wireless network (1000) includes a QSOCKS client device (100) and a QSOCKS server (200). The QSOCKS client device (100) can be, for example, but is not limited to, a smartphone, a laptop, a desktop, a smartwatch, a smart TV or a like.

Referring to FIG. 5A, in an embodiment, the QSOCKS client device (100) is configured to advertise a CHLO message to the QSOCKS server (200) using a QSKM tag, wherein the CHLO message comprises a plurality of client-supported SOCKS AUTH procedures. Further, the QSOCKS server (200) is configured to select a candidate client-supported SOCKS AUTH procedure from the plurality of client-supported SOCKS AUTH procedures. Further, the QSOCKS server (200) is configured to send the selected candidate client-supported SOCKS AUTH procedure in a reject packet using the QSKM tag.

In an embodiment, the QSOCKS client device (100) is configured to advertise the CHLO message to the QSOCKS server (200) using a QSKA tag, wherein the CHLO message comprises client credentials selected based on the selected AUTH method, and wherein the QSKA tag contains a SOCKS AUTH sub-negotiation. Further, the QSOCKS server (200) is configured to verify the credentials of the QSOCKS client device (100). Further, the QSOCKS server (200) is configured to send a QUIC Server Hello (SHLO) message using the QSKA tag in response to successful verification of the credentials.

In an embodiment, the QSOCKS client device (100) is configured to send a QSOCKS request, wherein the QSOCKS request comprises a message format. Further, the QSOCKS server (200) is configured to evaluate the QSOCKS request based on source and destination addresses, and return one or more reply messages. Further, the QSOCKS server (200) is configured to initiate SOCKS session. Further, the QSOCKS server (200) is configured to send a QSOCKS response to the QSOCKS client device (100).

In an embodiment, the plurality of client-supported SOCKS AUTH procedures comprises at least one of no authentication required, a generic security service application program interface (GSSAPI), a username, a password, an internet assigned numbers authority (IANA) assigned, a reserved, or an acceptable method.

In an embodiment, the message format of the QSOCKS request comprises an option to support at least one a TCP and UDP over a QUIC protocol.

In an embodiment, the QSOCKS response is received by evaluating the QSOCKS request based on the source address and the destination address.

In an embodiment, a block of the QSOCKS response indicates a field corresponding to a type of the QSOCKS request.

In an embodiment, the type is one of an asynchronous request type and a synchronous request type.

Figure 5B:
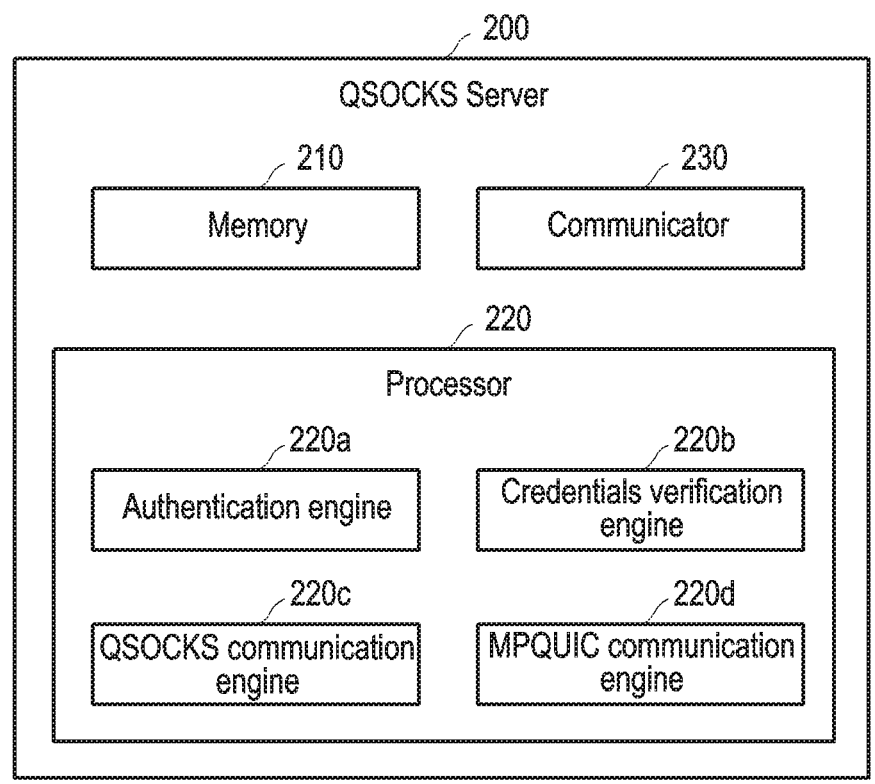
FIG. 5B illustrates a block diagram of a QSOCKS server for MPQUIC over QSOCKS in the wireless network, according to an embodiment of the disclosure.

FIG. 5B illustrates a block diagram of a QSOCKS server (200) for MPQUIC over QSOCKS in the wireless network (1000), according to an embodiment of the disclosure. In an embodiment, the QSOCKS server (200) includes a memory (210), a processor (220), and a communicator (230).

Referring to FIG. 5B, the memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory (210). In certain examples, a non-transitory storage medium may store data that can, over time, change (e.g., in Random Access Memory (210) (RAM) or cache). In an embodiment, the memory (210) can be an internal storage unit or it can be an external storage unit of the electronic device, a cloud storage, or any other type of external storage.

The processor (220) communicates with the memory (210), and the communicator (230). The processor (220) includes an authentication engine (220a), a credentials verification engine (220b), a QSOCKS communication engine (220c), and a MPQUIC communication engine (220d).

The authentication engine (220a) selects the candidate client-supported SOCKS AUTH procedure from the plurality of client-supported SOCKS AUTH procedures by receiving the CHLO message with QSKM tag from the QSOCKS client device (100). Further, the authentication engine (220a) sends the selected candidate client-supported SOCKS AUTH procedure in a reject packet using the QSKM tag.

The credentials verification engine (220b) verifies the credentials of the QSOCKS client device (100) by receiving the CHLO message with QSKA tag from QSOCKS client device (100). Further, the credentials verification engine (220b) sends the QUIC SHLO message using the QSKA tag in response to successful verification of the credentials.

The QSOCKS communication engine (220c) evaluates the QSOCKS request based on source and destination addresses, and returns one or more reply messages by receiving the QSOCKS request from the QSOCKS client device (100). Further, the QSOCKS communication engine (220c) initiates SOCKS session and sends the QSOCKS response to the QSOCKS client device (100). The MPQUIC communication engine (220d) is described with regard to FIG. 6.

The communicator (230) is configured for communicating internally between internal hardware components and with external devices via one or more networks.

Although the FIG. 5B shows various hardware components of the QSOCKS server (200) but it is to be understood that other embodiments are not limited thereon. In other embodiments, the QSOCKS server (200) may include a lesser or greater number of components. Further, the labels or names of the components are used only for illustrative purpose and does not limit the scope of the disclosure. One or more components can be combined together to perform same or substantially similar function for MPQUIC over QSOCKS in the wireless network (1000).

Figure 5C:
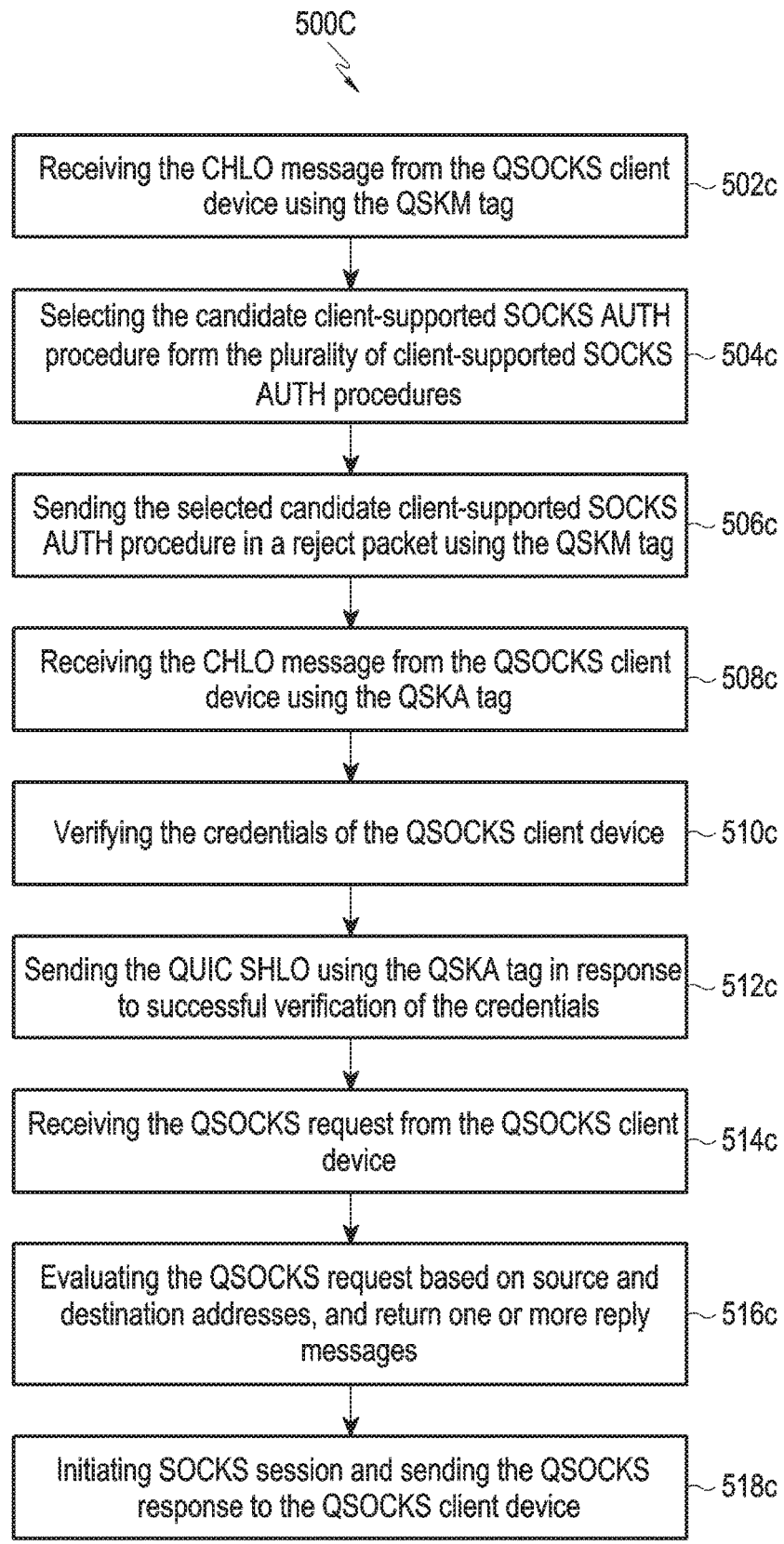
FIG. 5C is a flow diagram illustrating a method for MPQUIC over QSOCKS in the wireless network, according to an embodiment of the disclosure.

FIG. 5C is a flow diagram 500C illustrating a method for MPQUIC over QSOCKS in the wireless network (1000), according to an embodiment of the disclosure. The operations (502c-518c) are performed by the QSOCKS server (200).

Referring to FIG. 5C, at operation 502c, the method includes receiving the CHLO message from the QSOCKS client device (100) using the QSKM tag. At operation 504c, the method includes selecting the candidate client-supported SOCKS AUTH procedure from the plurality of client-supported SOCKS AUTH procedures. At operation 506c, the method includes sending the selected candidate client-supported SOCKS AUTH procedure in a reject packet using the QSKM tag. At operation 508c, the method includes receiving the CHLO message from the QSOCKS client device (100) using the QSKA tag. At operation 510c, the method includes verifying the credentials of the QSOCKS client device (100). At operation 512c, the method includes sending the QUIC SHLO message using the QSKA tag in response to successful verification of the credentials. At operation 514c, the method includes receiving the QSOCKS request from the QSOCKS client device (100). At operation 516c, the method includes evaluating the QSOCKS request based on source and destination addresses, and returning one or more reply messages. At operation 518c, the method includes initiating SOCKS session and sending the QSOCKS response to the QSOCKS client device (100).

Figure 6:
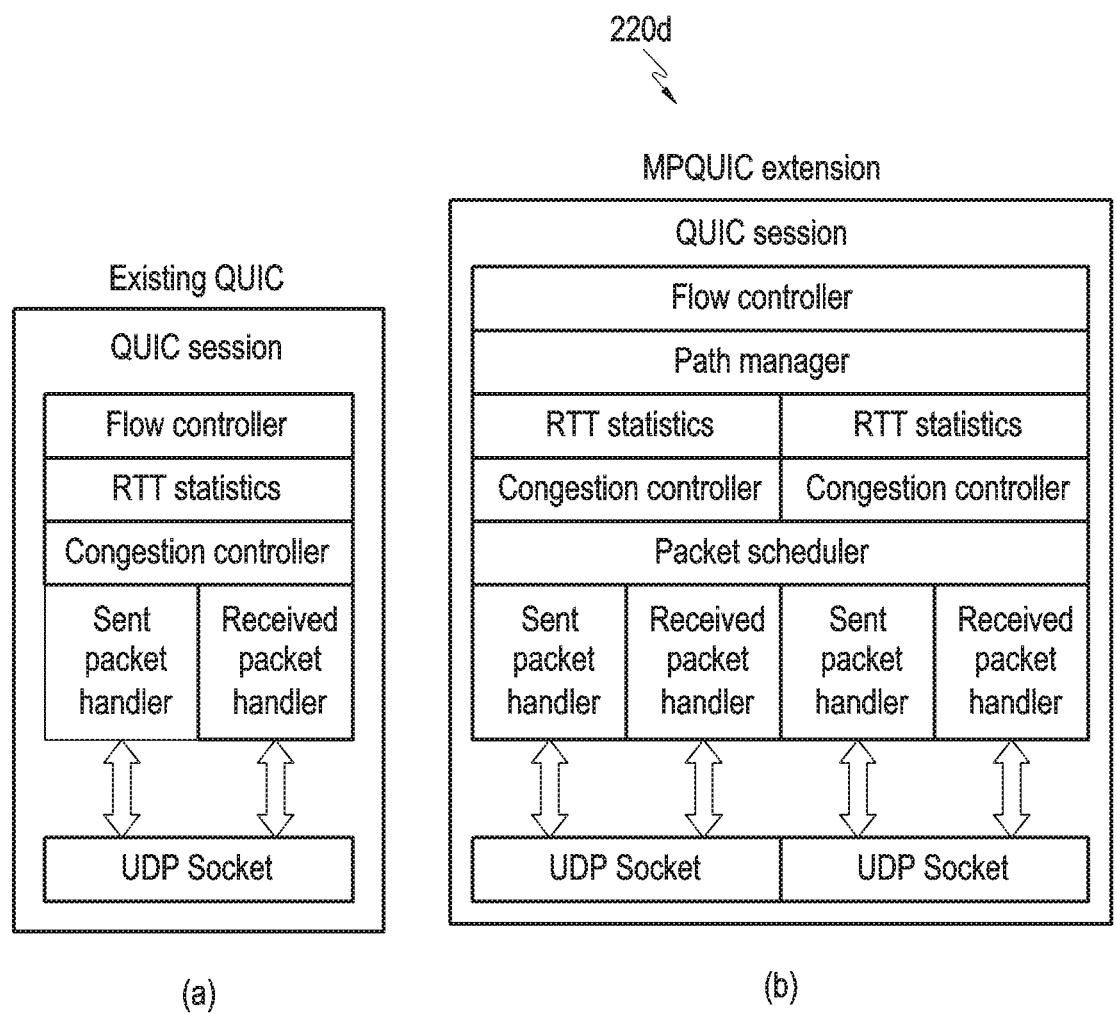
FIG. 6 is a block diagram of an existing QUIC implementation and its MPQUIC extension, according to an embodiment of the disclosure.

FIG. 6 is a block diagram of an existing QUIC implementation and its MPQUIC extension (220d), according to an embodiment of the disclosure. The MPQUIC (220d) includes a path manager, a packet scheduler, and a congestion controller.

Referring to FIG. 6, the MPQUIC performs the cryptographic handshake over the first path, like the QUIC. The MPQUIC uses the path manager to control the sub-flows. Each sub-flow is identified by including a path ID in the public header of each packet. The presence of path ID allows the MPQUIC to use multiple flows even during network address translation by middleboxes in the path. Since the QUIC stream can be bi-directional, the paths created by a client (i.e., a user) have an odd path ID to avoid path ID clashes. Unlike the MPTCP that requires a three-way handshake for sub-flow establishment, the MPQUIC can leverage a zero round trip time (RTT) (0-RTT) path establishment for all sub-flow.

Further, the MPQUIC introduces an add-address frame that advertises all the network addresses associated with the client. This frame is exchanged at the beginning of connection establishment or when network interface changes. Unlike the MPTCP, add-address in the MPQUIC is encrypted and are not prone to security concerns. The add-address frame additionally contains a flag to mark a sub-flow as a backup path. The backup sub-flow is used if there are no regular paths available. On the other hand, the path manager sends a remove-address frame to remove a specific sub-flow. The path manager redesigned specific to the smartphones. The metered interface and dedicated interfaces (such as Internet protocol (IP) multimedia subsystem (IMS)) are avoided during the MPQUIC sub-flow establishment. The proposed system and method also enabled IPv6 handling in the path manager.

Further, once the path manager establishes multiple sub-flows, the packet scheduler schedules the packets from streams on sub flows. The packet scheduler considers both sub-flow properties and stream requirements. The simple and default implementation of the packet scheduler relies on the smoothed measured RTT. The path with the lowest RTT is preferred unless its congestion window is full. Different from the MPTCP, the packet scheduler determines which control frames (window update, acknowledgment (ACK), paths, etc.) has to be sent on a particular sub-flow. Since the QUIC frames are independent of the packets containing them, they are not constrained to a particular sub-flow. Hence, the retransmission strategy is more flexible in the MPQUIC than MPTCP. The packet scheduler sends the window update frames on all active sub flows to guarantee the handling of receive buffer limitations. When a new path starts in the MPQUIC, the packet scheduler duplicates the data over the new sub-flow, since the sub-flow's characteristics are still unknown.

Further, the QUIC uses unique packet numbers and stream offsets for reliable communication. Even the re-transmitted packets use unique packet numbering. The MPQUIC also reuses a unique packet number space for each sub flow. The re-transmission timeouts are based on the sub flows' smoothened RTT estimates. After loss timeout, the packet scheduler decides to push the packet in other sub flows. Based on the sub-flow statistics such as estimated path RTT and timeouts, the packet scheduler can detect an underperforming or broken sub-flow and speed up the handover process in mobility scenarios.

Further, the MPQUIC uses a CUBIC as the default congestion control scheme for better bandwidth-delay than other existing congestion control scheme.

Figure 7A:
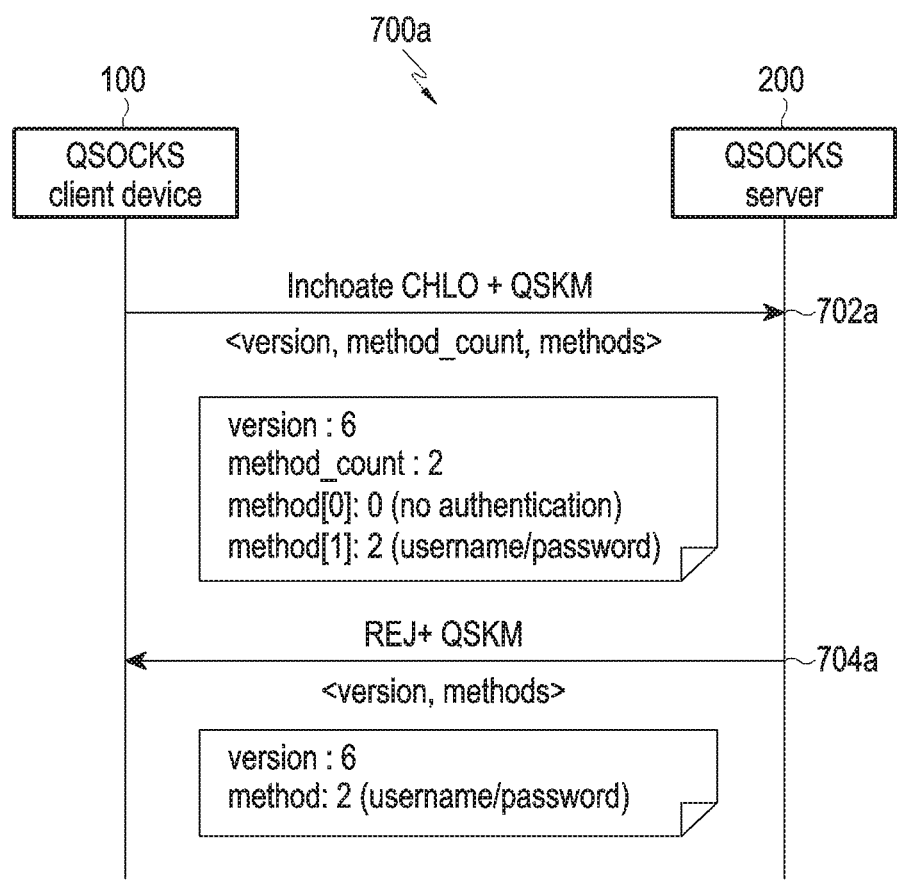
FIG. 7A is a sequence diagram illustrating a method for exchanging a QSOCKS method (QSKM) tag between a QSOCKS client and a QSOCKS server, according to an embodiment of the disclosure.

FIG. 7A is a sequence diagram 700a illustrating a method for exchanging a QSOCKS method (QSKM) tag between a QSOCKS client device and a QSOCKS server, according to an embodiment of the disclosure.

Referring to FIG. 7A, at 702a, the method includes advertising client (i.e. QSOCKS client) supported SOCKS AUTH methods using the QSKM tag in the QUIC inchoate CHLO message to the QSOCKS server (200). Further, the QSKM tag includes a version, a method count, and authentication methods. At 704a, the method includes selecting one among the advertised methods and communicates the selected method using the QSKM in a QUIC rejection (REJ) packet to the QSOCKS client. Further, the QSKM tag includes the version and a selected authentication method by the QSOCKS server (200).

A simple set of authentication methods for the proposed methods, X '00' indicates no authentication required, X '01' indicates a generic security service application program interface (GSSAPI), X '02' indicates a username/password, X '03' to X '7F' indicates internet assigned numbers authority assigned (IANA), X '80' to X 'FE' indicates reserved, and X 'FF' indicates no acceptable methods.

Figure 7B:
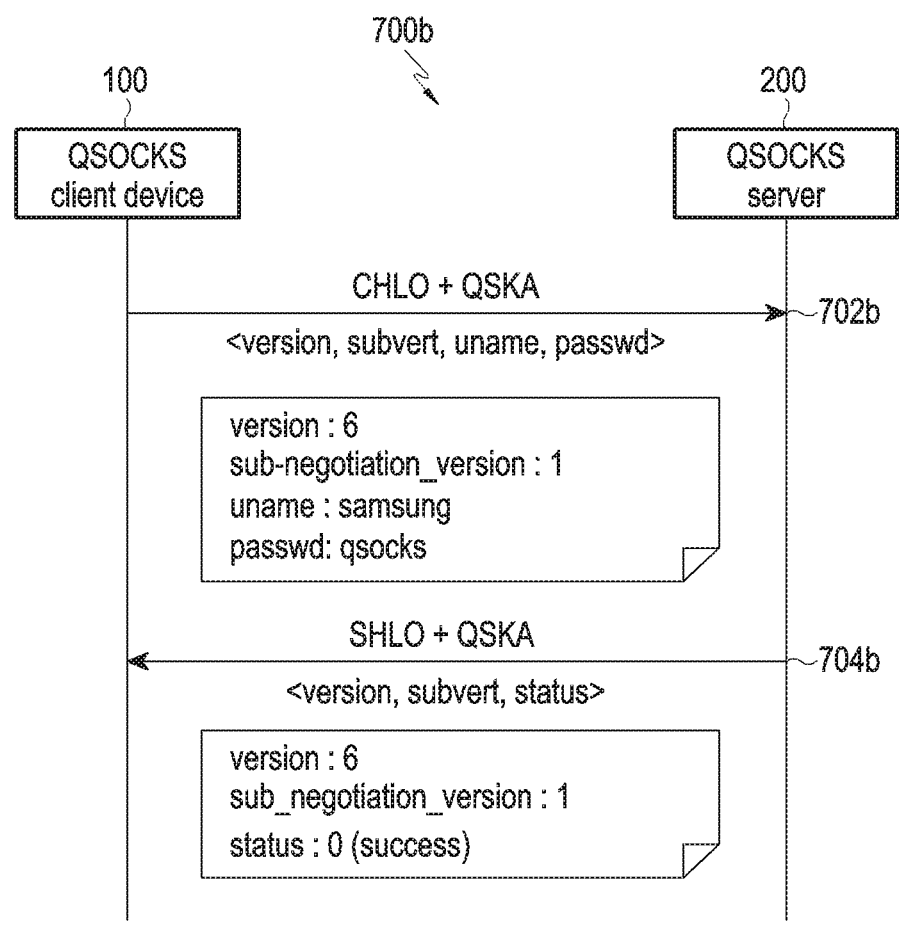
FIG. 7B is a sequence diagram illustrating a method for exchanging a QSOCKS authentication (AUTH) (QSKA) tag between a QSOCKS client and a QSOCKS server, according to an embodiment of the disclosure.

FIG. 7B is a sequence diagram 700b illustrating a method for exchanging a QSOCKS authentication (QSKA) tag between a QSOCKS client device and a QSOCKS server, according to an embodiment of the disclosure.

Referring to FIG. 7B, at 702b, the method includes advertising a QSOCKS authentication (QSKA) request in the QUIC CHLO message based on the selected authentication method. Further, the QSKA is an optional feature that contains the SOCKS AUTH sub-negotiation. Further, the QSKA includes the version, a sub-negotiation version and selected authentication method. At 704b, the method includes verifying supplied credentials and responds via QSKA response in a QUIC SHLO message. Further, the QSKA includes the version, sub-negotiation version, and a status.

FIG. 7C illustrates a QSOCKS request header format, according to an embodiment of the disclosure.

Referring to FIG. 7C, the QSOCKS request header includes the version, a CMD values, a reserve value, an address type, a destination address, a destination port, and a request type. The QSOCKS introduces two additional options to support TCP (X'04') and UDP (X'05') over the QUIC protocol. The SOCKS server typically evaluates request based on source and destination addresses, and returns one or more reply messages, as appropriate for the request type. This blocks the application data to be sent to the actual destination server. Hence, the QSOCKS introduces an additional field in the QSOCKS request is request type 'REQ.TYPE', which if enabled allows to piggyback the data along with the request. If the server responds with an error later, the stream is canceled.

Figure 7D:
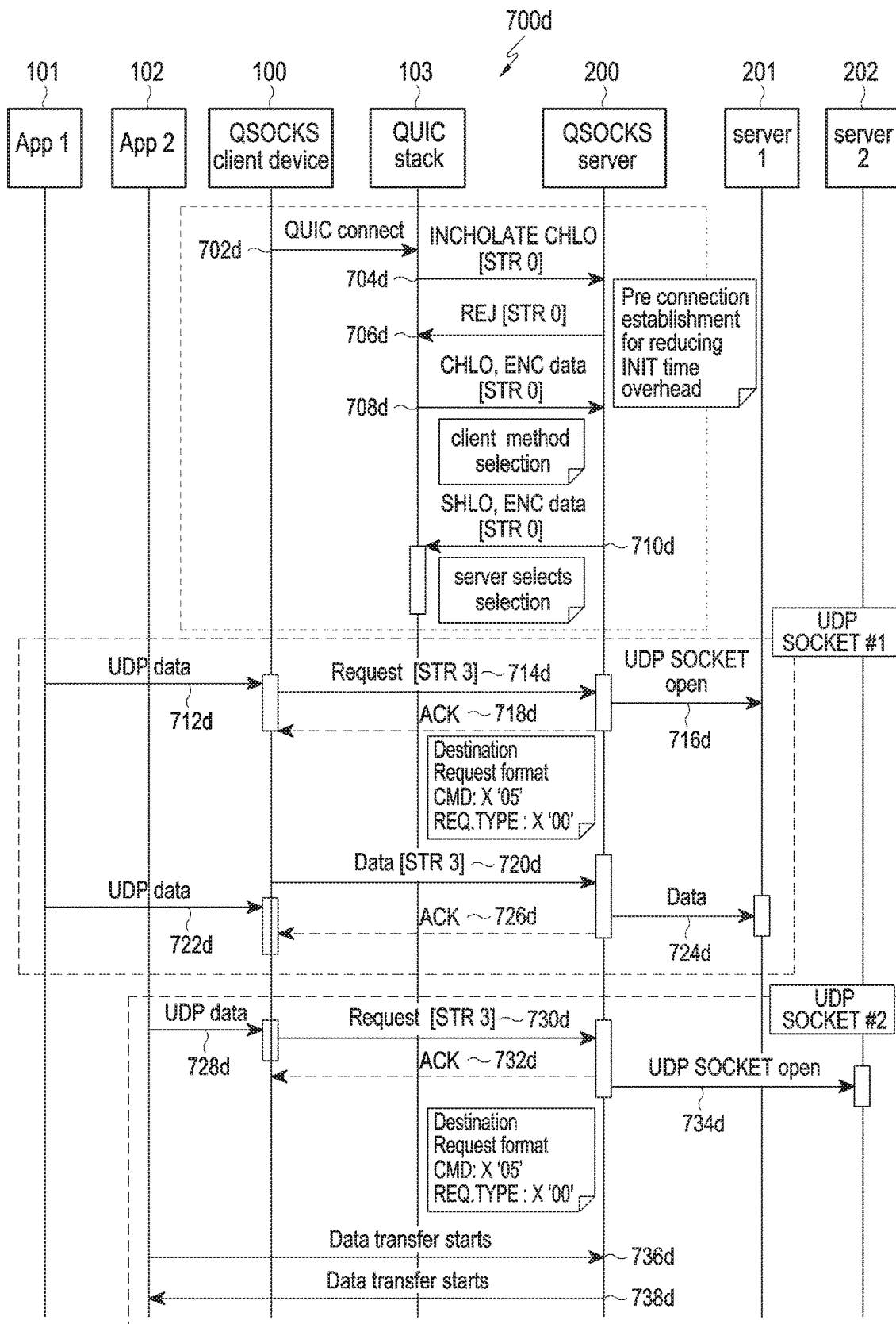
FIG. 7D is a sequence diagram illustrating a method for converting user datagram protocol (UDP) over the QSOCKS, according to an embodiment of the disclosure.

FIG. 7D is a sequence diagram 700d illustrating a method for converting UDP over the QSOCKS, according to an embodiment of the disclosure.

Referring to FIG. 7D, at 702d, the QSOCKS client device (100) sends QUIC connection request to a QUIC stack (103). At 704d, the QUIC stack (103) sends the CHLO message to the QSOCKS server (200). At 706d, the QSOCKS server (200) sends the rejection packet to the QUIC stack (103). At 708d, the QUIC stack (103) sends encrypted data with authentication methods in the CHLO message. At 710d, the QSOCKS server (200) sends the SHLO message and encrypted data based on the selected authentication method to the QUIC stack (103).

At 712d, an application-1 (101) sends UDP data to the QSOCKS client device (100). At 714d, based on receiving the UDP data the QSOCKS client device (100) sends a request to the QSOCKS server (200). At 716d, the QSOCKS server (200) opens a UDP socket and sends to a server-1 (201). At 718d, the QSOCKS server (200) sends an ACK to the QSOCKS client device (100). At 720d, the QSOCKS client device (100) sends data with destination request format, CMD value for UDP over QUIC and request type. At 722d, the application-1 (101) sends the UDP data to the QSOCKS client device (100). At 724d, the QSOCKS server (200) sends the data to the server-1 (201). At 726, the QSOCKS server (200) sends an ACK to the QSOCKS client. The operation 712d-726d is related to a first UDP socket. The operations 728d-738d are related to a second UDP socket, same procedure as the first UDP socket by an application-2 (102).

Figure 7E:
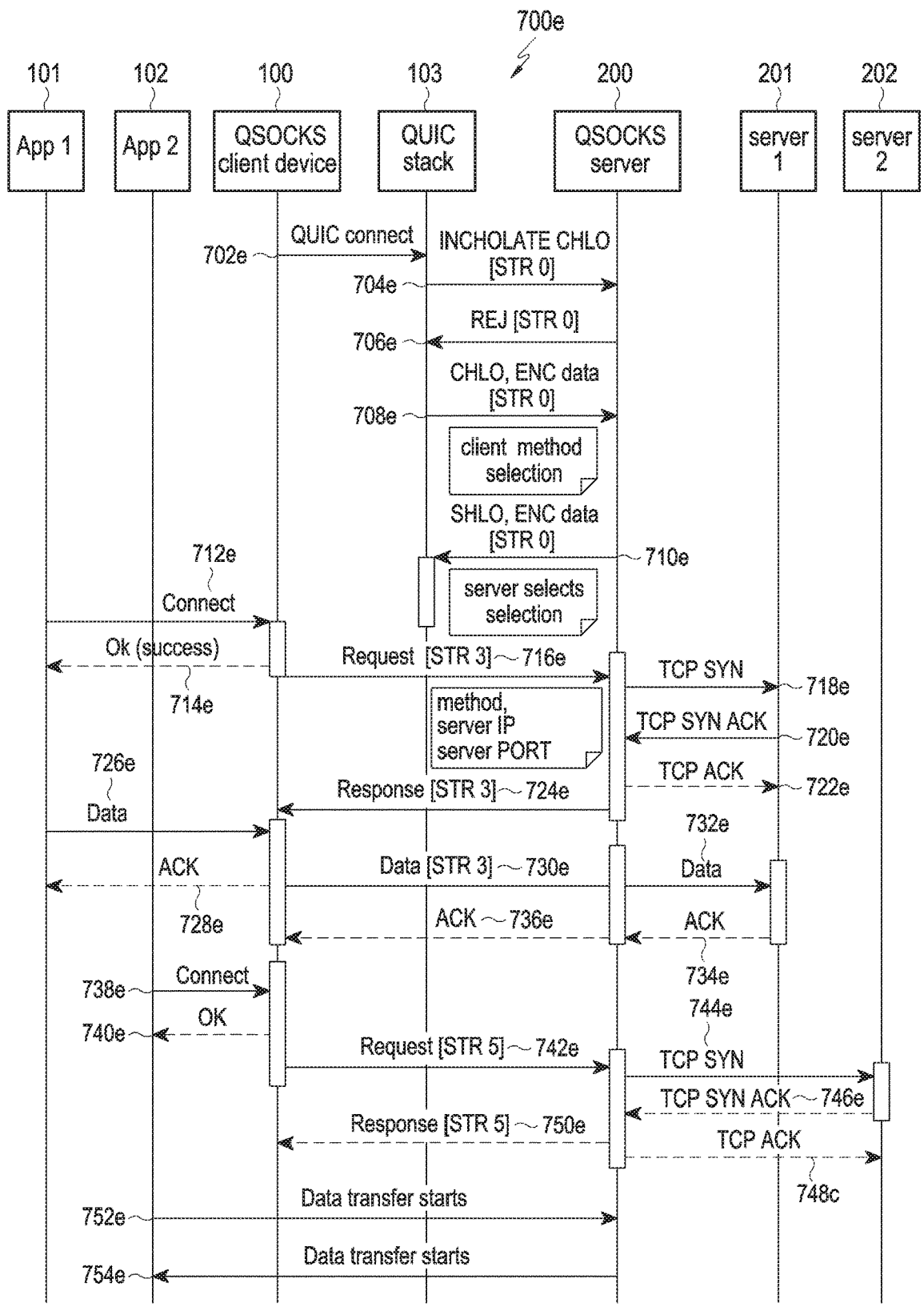
FIG. 7E is a sequence diagram illustrating a method for converting TCP over the QSOCKS and TCP lowest possible latency over the QSOCKS, according to an embodiment of the disclosure.

FIG. 7E is a sequence diagram 700e illustrating a method for converting TCP over the QSOCKS and TCP lowest possible latency over the QSOCKS, according to an embodiment of the disclosure.

Referring to FIG. 7E, at 702e, the QSOCKS client device (100) sends a QUIC connection request to the QUIC stack (103). At 704e, the QUIC stack (103) sends the CHLO message to the QSOCKS server (200). At 706e, the QSOCKS server (200) sends the rejection packet to the QUIC stack (103). At 708e, the QUIC stack (103) sends encrypted data with authentication methods in the CHLO message. At 710e, the QSOCKS server (200) sends the SHLO message and encrypted data based on the selected authentication method to the QUIC stack (103).

At 712e, the application-1 (101) sends a connection request to the QSOCKS client. At 714e, the QSOCKS client device (100) responds to the connection request to the application-1 (101). At 716e, the QSOCKS client device (100) sends a request message with method, server IP, and server port details to the QSOCKS server (200). At 718e-722e, a TCP session is established between the QSOCKS server (200) and the server-1 (201). At 724e, the QSOCKS server (200) sends a response to the QSOCKS client device (100). At 726e, the application-1 (101) sends data to the QSOCKS client device (100). At 728e, the QSOCKS client device (100) sends an ACK to the application-1 (101). At 730e, the QSOCKS client device (100) sends data to the QSOCKS server (200). At 732e, the QSOCKS server (200) sends data to the server-1 (201). At 734e, the server-1 (201) sending an ACK of received data to the server-1 (201). At 736e, the QSOCKS server (200) sends an ACK of received data to the QSOCKS client device (100). At 738e, the application-2 (102) sends a connection request to the QSOCKS client device (100). At 740e, the QSOCKS client device (100) sends a response to the connection request to the application-2 (102). At 742e, the QSOCKS client device (100) sends a request message to the QSOCKS server (200). At 744e-748e, a TCP session is established between the QSOCKS server (200) and the server-2 (202). At 750e, the QSOCKS server (200) sends a response to the QSOCKS client device (100). At 752e-754e, the application-2 (102) sends data to the QSOCKS server (200) and receives data from the QSOCKS server (200).

Figure 7F:
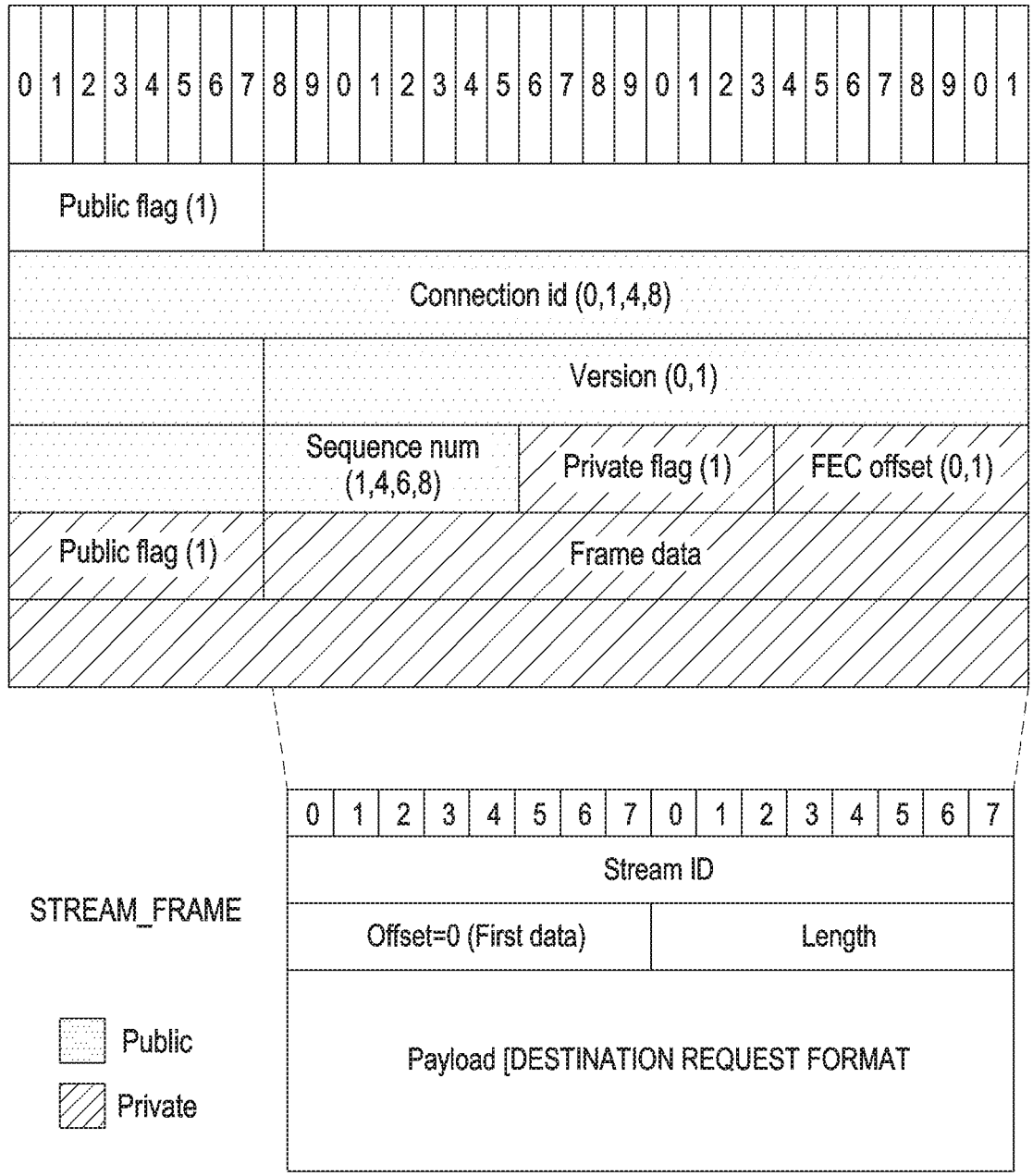
FIG. 7F illustrates a destination address frame of the QSOCKS request header format, according to an embodiment of the disclosure.

FIG. 7F illustrates a destination address frame of the QSOCKS request header format, according to an embodiment of the disclosure.

Referring to FIG. 7F, the destination address frame of QSOCKS request header format as a part of payload. The initial bytes of payload are encapsulated with a destination frame comprising the destination details such as Internet protocol (IP) type, IP address, PORT, and the protocol to be connected.

Figure 7G:
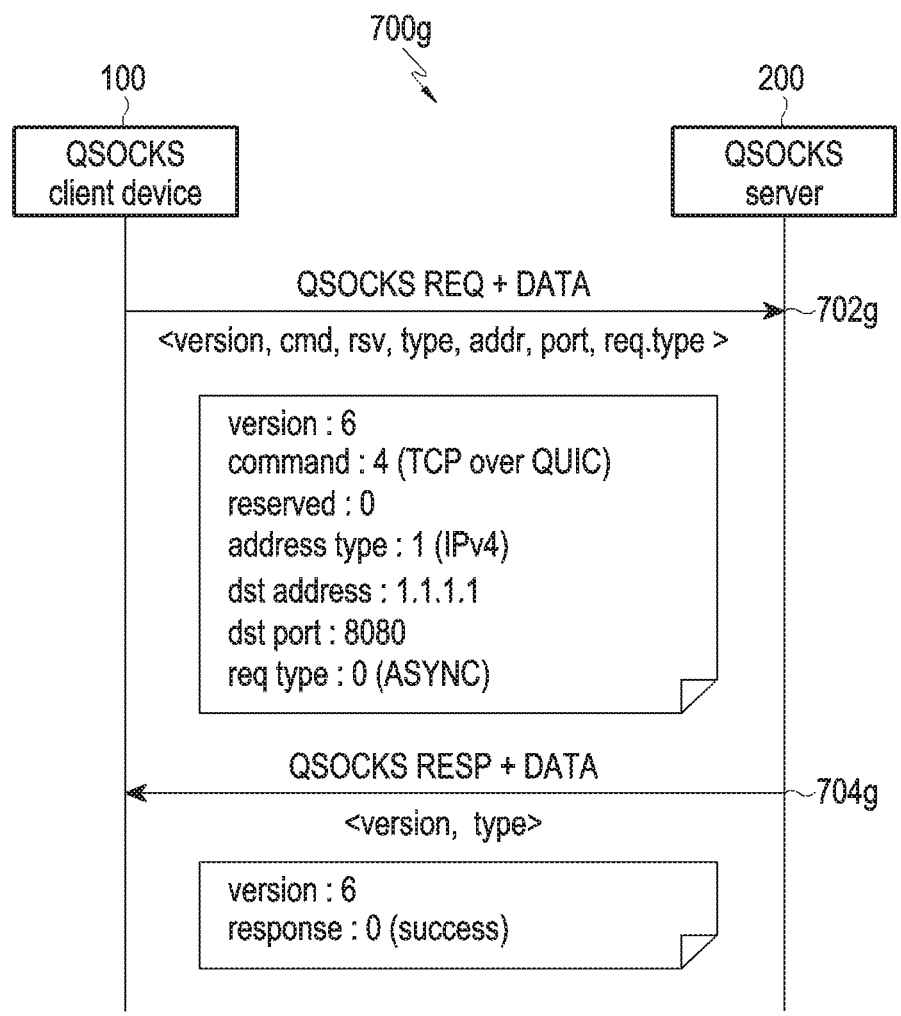
FIG. 7G is a sequence diagram illustrating a method for a QSOCKS asynchronous request between a QSOCKS client and a QSOCKS server, according to an embodiment of the disclosure.

FIG. 7G is a sequence diagram 700g illustrating a method for a QSOCKS asynchronous request between a QSOCKS client device and a QSOCKS server, according to an embodiment of the disclosure.

Referring to FIG. 7G, at 702g, the QSOCKS client device (100) sends a QSOCKS request with data to the QSOCKS server (200). Once the QSOCKS authentication is complete, every new SOCKS session is initiated via the QSOCKS request. The QSOCKS request is integrated into the payload of a QUIC STREAM frame (refer to FIG. 7C). The QSOCKS request includes version, command value, reserved value, address type, destination address, destination port, and request type (i.e. asynchronous request). At 704g, the QSOCKS server (200) sends a QSOCKS response with data. The QSOCKS response includes version and response value. The user application sessions are made 0-RTT by leveraging asynchronous QSOCKS request.

Figure 7H:
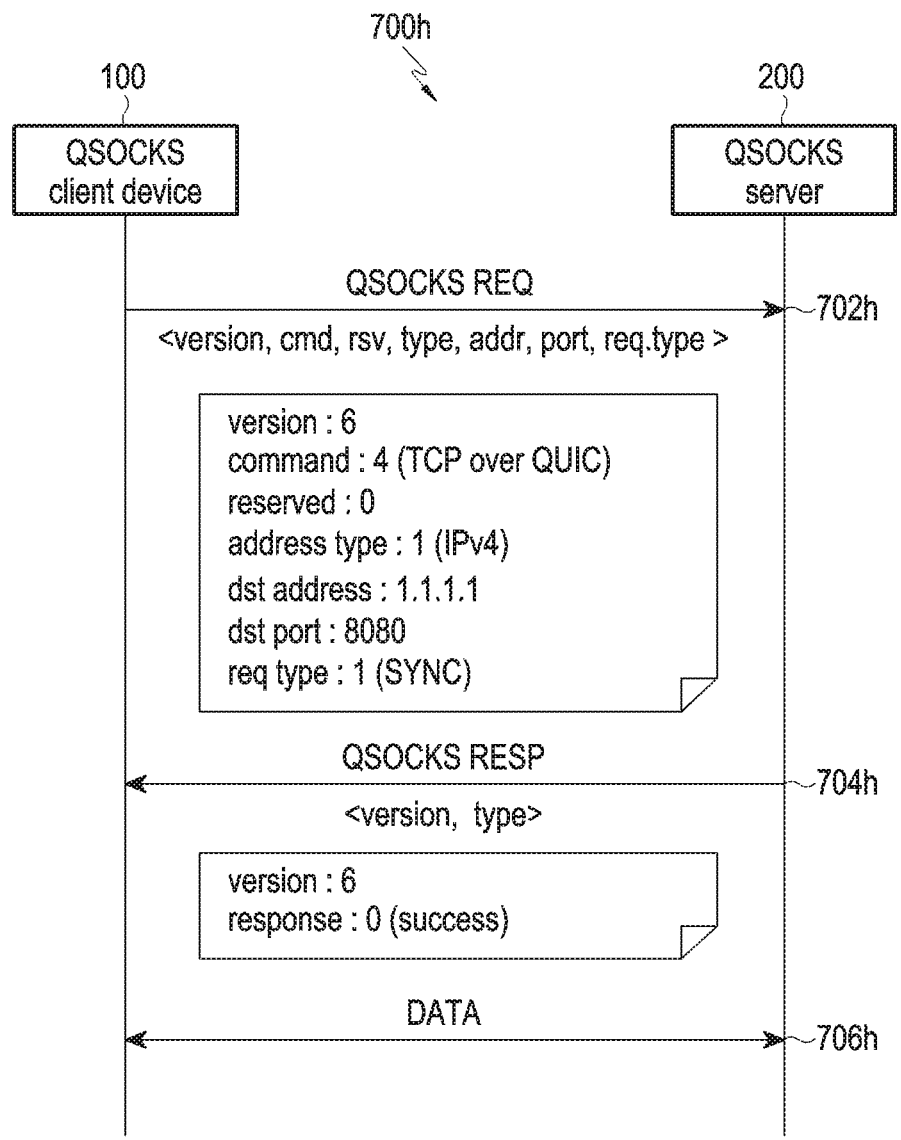
FIG. 7H is a sequence diagram illustrating a method for a QSOCKS synchronous request between a QSOCKS client and a QSOCKS server, according to an embodiment of the disclosure.

FIG. 7H is a sequence diagram 700h illustrating a method for a QSOCKS synchronous request between a QSOCKS client device and a QSOCKS server, according to an embodiment of the disclosure.

Referring to FIG. 7H, at 702h, the QSOCKS client device (100) sends a QSOCKS request to the QSOCKS server (200). Once the QSOCKS authentication is complete, every new SOCKS session is initiated via the QSOCKS request. The QSOCKS request is integrated into the payload of a QUIC STREAM frame (refer FIG. 7C). The QSOCKS request includes version, command value, reserved value, address type, destination address, destination port, and request type (i.e. synchronous request). At 704h, the QSOCKS server (200) sends a QSOCKS response. At 706h, data communication starts between the QSOCKS client device (100) and QSOCKS server (200).

Figure 8A:
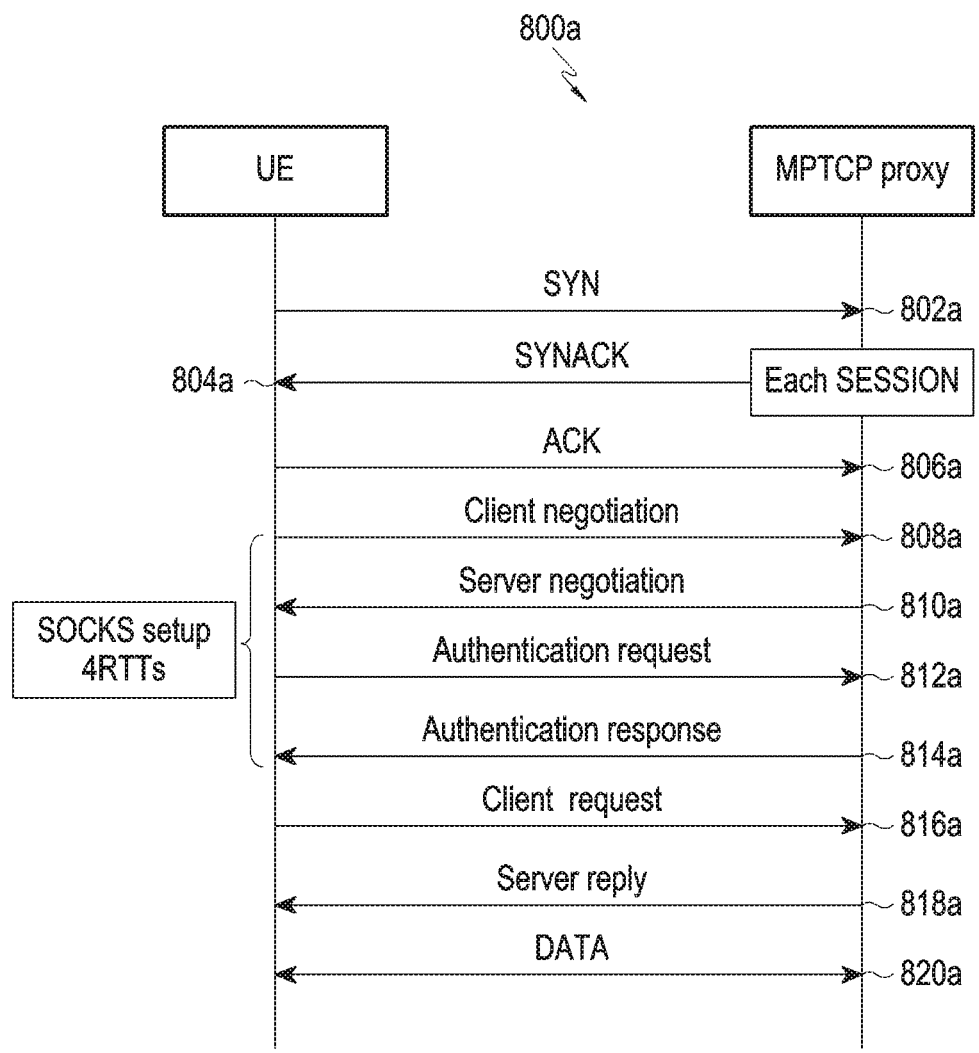
FIGS. 8A and 8B are overall sequence diagrams comparison of the QSOCKS and TCP SOCKSv5, according to various embodiments of the disclosure.
Figure 8B:
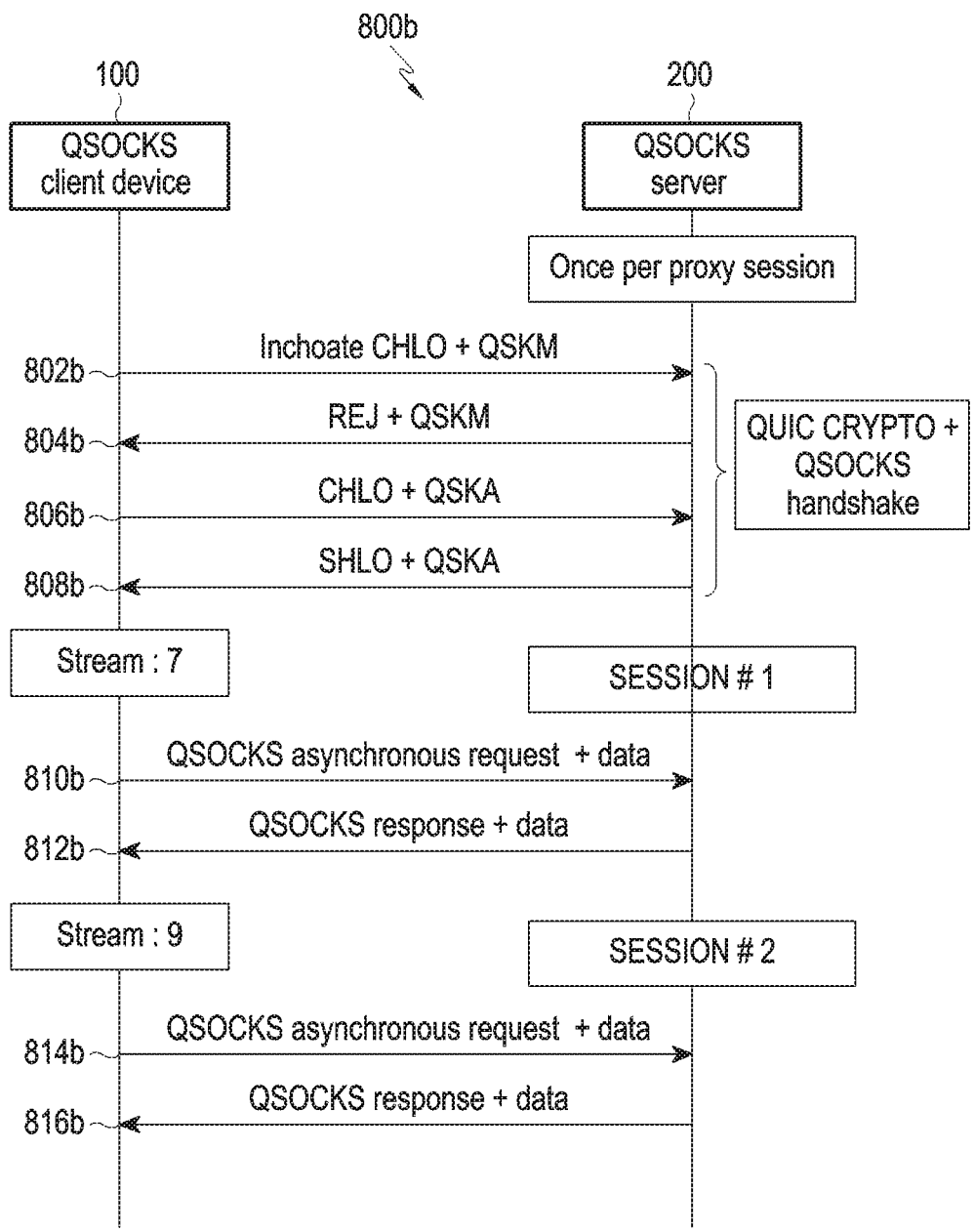

FIGS. 8A and 8B are an overall sequence diagram comparison of the QSOCKS and TCP SOCKSv5, according to various embodiments of the disclosure.

Referring to FIG. 8A, the notation 'a' indicates an overall sequence diagram 800a of the TCP SOCKSv5. At 802a, a user equipment (UE) (i.e., a same functionality as QSOCKS client device (100)) sends a synchronous message to an MPTCP proxy. At 804a, the MPTCP proxy sends a synchronous ACK message to the UE for each session. At 806a, the UE sends a received ACK message to the MPTCP proxy. At 808a, the UE sends a client negotiation message to the MPTCP proxy. At 810a, the MPTCP proxy sends a server negotiation message to the UE. At 812a, the UE sends an authentication request message to the MPTCP proxy. At 814a, the MPTCP proxy sends authentication response to the UE. At 816a, the UE sends a client request to the MPTCP proxy. At 818a, the MPTCP proxy sends a server reply message to the UE. At 820a, data communication starts between the UE and MPTCP proxy. The key issue in SOCKSv5 is that it requires 7-RTTs (TCP Handshake, method negotiation, authentication, connection request, connection response, TLS negotiation, TLS grant) for the secured connection and 5-RTTs for plain connection to exchange data.

Referring to FIG. 8B, the notation 'b' indicates an overall sequence diagram 800b of the QSOCKS. At 802b, the QSOCKS client device (100) advertises a client (i.e. QSOCKS client device (100)) supported SOCKS AUTH methods using the QSKM tag in the QUIC inchoate CHLO message to the QSOCKS server (200). At 804b, the QSOCKS server (200) selects one among the advertised methods and communicates the selected method using the QSKM in the QUIC REJ packet to the QSOCKS client device (100). At 806b, the QSOCKS client device (100) advertises the QSKA request in the QUIC CHLO message based on the selected authentication method. At 808b, the QSOCKS server (200) verifies supplied credentials and responds via QSKA response in the QUIC SHLO message. The QSOCKS is designed to reduce the initial establishment overhead, exchanging data in 0-RTT. This impacts the short-lived connections and page loading time. In addition to the handshake improvement, QSOCKS also enhances the security by making the QSOCKS authentication and QSOCKS request incognito using QUIC 0-RTT keys.

Once the QSOCKS authentication is completed, every new SOCKS session is initiated via the QSOCKS request. The QSOCKS request is integrated into the payload of the QUIC STREAM frame. At 810b, the QSOCKS client device (100) sends a QSOCKS asynchronous request with data to the QSOCKS server (200) for a first session. At 812b, the QSOCKS server (200) sends a QSOCKS response with the data to the QSOCKS client device (100). At 814b, the QSOCKS client device (100) sends a QSOCKS asynchronous request with data to the QSOCKS server (200) for a second session. At 816b, the QSOCKS server (200) sends a QSOCKS response with the data to the QSOCKS client device (100).

The embodiments disclosed herein can be implemented using at least one software program running on at least one hardware device and performing network management functions to control the elements.

While the disclosure has been shown and described with reference to various embodiments thereof, it will be understood by those skilled in the art will that various changes in form and details may be made therein without departing from the spirit and scope of the disclosure as defined by the appended claims and their equivalents.

What is claimed is:

1. A method for Multipath Quick User Datagram Protocol (UDP) Internet Connections (MPQUIC) over Quick Socket Secure (SOCKS) protocol (QSOCKS) in a wireless network, the method comprising:
   receiving, by a QSOCKS server, a Client Hello (CHLO) message from a QSOCKS client device using a QSOCKS method (QSKM) tag, wherein the CHLO message comprises a plurality of client-supported SOCKS Authentication (AUTH) procedures;
   selecting, by the QSOCKS server, a candidate client-supported SOCKS AUTH procedure from the plurality of client-supported SOCKS AUTH procedures; and
   transmitting, by the QSOCKS server, a reject packet using the QSKM tag to the QSOCKS client device,
   wherein the reject packet includes information indicating the selected candidate client-supported SOCKS AUTH procedure.

2. The method of claim 1, further comprising:
   receiving, by the QSOCKS server, the CHLO message from the QSOCKS client device using a QSOCKS authentication (QSKA) tag, wherein the CHLO message comprises client credentials selected based on the selected SOCKS AUTH procedure, and wherein the QSKA tag contains a SOCKS AUTH sub-negotiation;
   verifying, by the QSOCKS server, the credentials of the QSOCKS client device; and
   transmitting, by the QSOCKS server, a Quick UDP Internet Connections (QUIC) Server Hello (SHLO) message using the QSKA tag in response to successful verification of the credentials.

3. The method of claim 2, further comprising:
   receiving, by the QSOCKS server, a QSOCKS request from the QSOCKS client device, wherein the QSOCKS request comprises a message format;
   evaluating, by the QSOCKS server, the QSOCKS request based on source and destination addresses, and returning one or more reply messages;
   initiating, by the QSOCKS server, a SOCKS session; and
   transmitting, by the QSOCKS server, a QSOCKS response to the QSOCKS client device, wherein a block of the QSOCKS response indicates a field corresponding to a type of the QSOCKS request, and wherein the type is one of an asynchronous request type or a synchronous request type.

4. The method of claim 3, wherein the message format of the QSOCKS request comprises an option to support at least one of transmission control protocol (TCP) or UDP over a Quick UDP Internet Connections (QUIC) protocol.

5. The method of claim 1, wherein the plurality of client-supported SOCKS AUTH procedures comprises at least one of no authentication required, a generic security service application program interface (GSSAPI), a username, a password, an internet assigned numbers authority (IANA) assigned, a reserved, or an acceptable method.

6. A method for Multipath Quick User Datagram Protocol (UDP) Internet Connections (MPQUIC) over Quick Socket Secure (SOCKS) protocol (QSOCKS) in a wireless network, the method comprising:
transmitting, by a QSOCKS client device, a Client Hello (CHLO) message to a QSOCKS server using a QSOCKS method (QSKM) tag, wherein the CHLO message comprises a plurality of client-supported SOCKS Authentication (AUTH) procedures; and
receiving, by the QSOCKS client device, a reject packet using the QSKM tag from the QSOCKS server,
wherein the reject packet includes information indicating a candidate client-supported SOCKS AUTH procedure which is selected by the QSOCKS server from the plurality of client-supported SOCKS AUTH procedures.

7. The method of claim 6, further comprising:
transmitting, by the QSOCKS client device, the CHLO message to the QSOCKS server using a QSOCKS authentication (QSKA) tag, wherein the CHLO message comprises client credentials selected based on the selected SOCKS AUTH procedure, and wherein the QSKA tag contains a SOCKS AUTH sub-negotiation; and
receiving, by the QSOCKS client device, a Quick UDP Internet Connections (QUIC) Server Hello (SHLO) message using the QSKA tag from the QSOCKS server, in response to the QSOCKS server successfully verifying the credentials of the QSOCKS client device.

8. The method of claim 7, further comprising:
transmitting, by QSOCKS client device, a QSOCKS request to the QSOCKS server, wherein the QSOCKS request comprises a message format; and
receiving, by QSOCKS client device, a QSOCKS response from the QSOCKS server, in response to the QSOCKS server initiating a SOCKS session by evaluating the QSOCKS request based on source and destination addresses,
wherein a block of the QSOCKS response indicates a field corresponding to a type of the QSOCKS request, and wherein the type is one of an asynchronous request type or a synchronous request type.

9. The method of claim 8, wherein the message format of the QSOCKS request comprises an option to support at least one of transmission control protocol (TCP) or UDP over a QUIC protocol.

10. The method of claim 6, wherein the plurality of client-supported SOCKS AUTH procedures comprises at least one of no authentication required, a generic security service application program interface (GSSAPI), a username, a password, an internet assigned numbers authority (IANA) assigned, a reserved, or an acceptable method.

11. A Quick Socket Secure (SOCKS) protocol (QSOCKS) server for Multipath Quick User Datagram Protocol (UDP) Internet Connections (MPQUIC) over QSOCKS in a wireless network, the QSOCKS server comprising:
a memory;
a transceiver; and
at least one processor coupled to the memory and the transceiver,
wherein the at least one processor is configured to:
receive a Client Hello (CHLO) message from a QSOCKS client device using a QSOCKS method (QSKM) tag, wherein the CHLO message comprises a plurality of client-supported SOCKS Authentication (SOCKS AUTH) procedures,
select a candidate client-supported SOCKS AUTH procedure from the plurality of client-supported SOCKS AUTH procedures, and
transmit a reject packet using the QSKM tag to the QSOCKS client device, and
wherein the reject packet includes information indicating the selected candidate client-supported SOCKS AUTH procedure.

12. The QSOCKS server of claim 11, wherein the at least one processor is further configured to:
receive the CHLO message from the QSOCKS client device using a QSOCKS authentication (QSKA) tag, wherein the CHLO message comprises client credentials selected based on the selected SOCKS AUTH method, and wherein the QSKA tag contains a SOCKS AUTH sub-negotiation,
verify the credentials of the QSOCKS client device, and
transmit a Quick UDP Internet Connections (QUIC) Server Hello (SHLO) message using the QSKA tag in response to successful verification of the credentials.

13. The QSOCKS server of claim 12,
wherein the at least one processor is further configured to:
receive a QSOCKS request from the QSOCKS client device, wherein the QSOCKS request comprises a message format,
evaluate the QSOCKS request based on source and destination addresses, and return one or more reply messages,
initiate a SOCKS session, and
transmit a QSOCKS response to the QSOCKS client device,
wherein a block of the QSOCKS response indicates a field corresponding to a type of the QSOCKS request, and wherein the type is one of an asynchronous request type or a synchronous request type.

14. The QSOCKS server of claim 13, wherein the message format of the QSOCKS request comprises an option to support at least one transmission control protocol (TCP) or UDP over a QUIC protocol.

15. The QSOCKS server of claim 11, wherein the plurality of client-supported SOCKS AUTH procedures comprises at least one of no authentication required, a generic security service application program interface (GSSAPI), a username, a password, an internet assigned numbers authority (IANA) assigned, a reserved, or an acceptable method.

16. A Quick Socket Secure (SOCKS) protocol (QSOCKS) client device for Multipath Quick User Datagram Protocol (UDP) Internet Connections (MPQUIC) over QSOCKS in a wireless network, the QSOCKS client device comprising:
a memory;
a transceiver; and
at least one processor coupled to the memory and the transceiver, wherein the at least one processor is configured to:
    transmit a Client Hello (CHLO) message to a QSOCKS server using a QSOCKS method (QSKM) tag, wherein the CHLO message comprises a plurality of client-supported SOCKS Authentication (AUTH) procedures, and
    receive a reject packet using the QSKM tag from the QSOCKS server, and
    wherein the reject packet includes information indicating a candidate client-supported SOCKS AUTH procedure which is selected by the QSOCKS server from the plurality of client-supported SOCKS AUTH procedures.

17. The QSOCKS client device of claim 16, wherein the at least one processor is further configured to:
    transmit the CHLO message to the QSOCKS server using a QSOCKS authentication (QSKA) tag, wherein the CHLO message comprises client credentials selected based on the selected SOCKS AUTH procedure, and wherein the QSKA tag contains a SOCKS AUTH sub-negotiation, and
    receive a Quick UDP Internet Connections (QUIC) Server Hello (SHLO) message using the QSKA tag from the QSOCKS server, in response to the QSOCKS server successfully verifying the credentials of the QSOCKS client device.

18. The QSOCKS client device of claim 17, wherein the at least one processor is further configured to:
    transmit a QSOCKS request to the QSOCKS server, wherein the QSOCKS request comprises a message format, and
    receive a QSOCKS response from the QSOCKS server, in response to the QSOCKS server initiating a SOCKS session by evaluating the QSOCKS request based on source and destination addresses,
    wherein a block of the QSOCKS response indicates a field corresponding to a type of the QSOCKS request, and
    wherein the type is one of an asynchronous request type or a synchronous request type.

19. The QSOCKS client device of claim 18, wherein the message format of the QSOCKS request comprises an option to support at least one transmission control protocol (TCP) or UDP over a QUIC protocol.

20. The QSOCKS client device of claim 16, wherein the plurality of client-supported SOCKS AUTH procedures comprises at least one of no authentication required, a generic security service application program interface (GSSAPI), a username, a password, an internet assigned numbers authority (IANA) assigned, a reserved, or an acceptable method.

* * * * *